(12) United States Patent
Kuroki

(10) Patent No.: US 7,528,879 B2
(45) Date of Patent: May 5, 2009

(54) INFORMATION PROCESSING APPARATUS, INFORMATION PROCESSING SYSTEM, AND CONVERSATION PARTNER DISPLAY METHOD WHILE PRESENTING A PICTURE

(75) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 10/515,288

(22) PCT Filed: May 16, 2003

(86) PCT No.: PCT/JP03/06155

§ 371 (c)(1),
(2), (4) Date: Nov. 19, 2004

(87) PCT Pub. No.: WO03/098942

PCT Pub. Date: Nov. 27, 2003

(65) Prior Publication Data

US 2005/0175257 A1    Aug. 11, 2005

(30) Foreign Application Priority Data

May 21, 2002  (JP)  ............................. 2002-146181
Dec. 10, 2002  (JP)  ............................. 2002-358567

(51) Int. Cl.
*H04N 5/222* (2006.01)
(52) U.S. Cl. ................................. 348/333.03
(58) Field of Classification Search .............. 348/14.01, 348/14.16, 42, 218.1, 333.03
See application file for complete search history.

(56) References Cited

U.S. PATENT DOCUMENTS 5,359,362 A    10/1994  Lewis et al.

6,259,470 B1 *  7/2001  Koizumi et al. ............ 348/14.1

FOREIGN PATENT DOCUMENTS

| JP | 9-121370  | 5/1997 |
| JP | 10-75432  | 3/1998 |
| JP | 10-108152 | * 4/1998 |

(Continued)

OTHER PUBLICATIONS

Machine translation of foreign application publication JP 10-221644 (PAJ) submitted in IDS.*

(Continued)

*Primary Examiner*—Tuan V Ho
*Assistant Examiner*—Kent Wang
(74) *Attorney, Agent, or Firm*—Frommer Lawrence & Haug LLP; William S. Frommer; Thomas F. Presson

(57) ABSTRACT

An image processing apparatus comprises an image display unit for displaying a desired image in accordance with an image signal, and image pickup units disposed respectively on the left and right sides of the image display unit. An image picked up from the left side and an image picked up from the right side are displayed together to be synthesized as the desired image in an image display unit of, e.g., a terminal of a conversation partner. Display in eye-to-eye matching with the conversation partner is thereby realized. An image processing apparatus, such as a portable communication terminal, capable of realizing conversation in a natural eye-to-eye matching state with the conversation partner can be provided.

34 Claims, 26 Drawing Sheets

FOREIGN PATENT DOCUMENTS

| JP | 10-221644 | * | 8/1998 |
| JP | 11-75173 | | 3/1999 |
| JP | 11-075173 | * | 3/1999 |

OTHER PUBLICATIONS

Machine translation of foreign application publication JP 10-108152 (PAJ) submitted in IDS.*

Machine translation of foreign application publication JP 11-075173 (PAJ) submitted in IDS.*

Patent Abstracts of Japan, vol. 1998, No. 09, Jul. 31, 1998 & JP 10 108152 A (Sanyo Electric Co Ltd), Apr. 24, 1998.

Patent Abstracts of Japan, vol. 1995, No. 05, Jun. 30, 1995 & JP 07 050855 A (Sharp Corp); Feb. 21, 1995.

* cited by examiner

Fig.9A

| L | L | L | L |
|---|---|---|---|
| R | R | R | R |
| L | L | L | L |
| R | R | R | R |

Fig.9B

| L | R | L | R |
|---|---|---|---|
| L | R | L | R |
| L | R | L | R |
| L | R | L | R |

Fig.9C

| L | R | L | R |
|---|---|---|---|
| R | L | R | L |
| L | R | L | R |
| R | L | R | L |

Fig.9D

| L | L | R | R |
|---|---|---|---|
| L | L | R | R |
| R | R | L | L |
| R | R | L | L |

Fig.9E

| L | R | R | L |
|---|---|---|---|
| L | L | R | R |
| R | L | L | R |
| R | R | L | L |

$$y = \sqrt{(r^2 - x^2)}$$

$$h = r\cos\left(\frac{\phi}{2}\right)$$

$$S = 2\pi \int_h^r y \sqrt{\left(1 + \left(\frac{dy}{dx}\right)^2\right)}\, dx$$

$$S_{ratio} = \frac{S}{2\pi r^2}$$

$$S_{ratio} = \frac{S}{2\pi r^2}$$

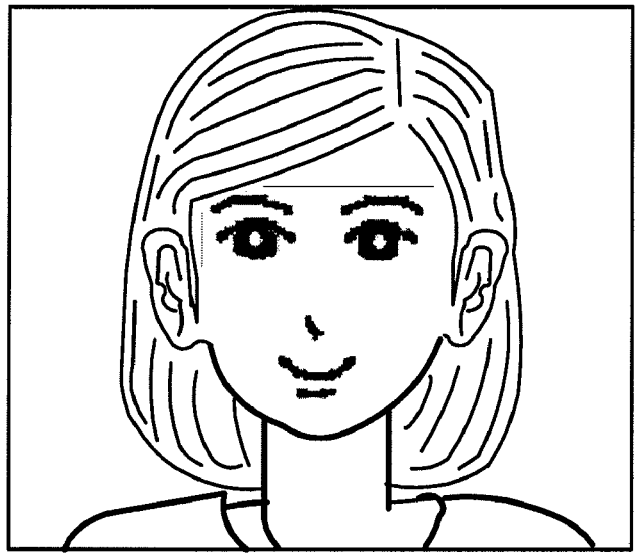
RELATED ART
Fig. 26
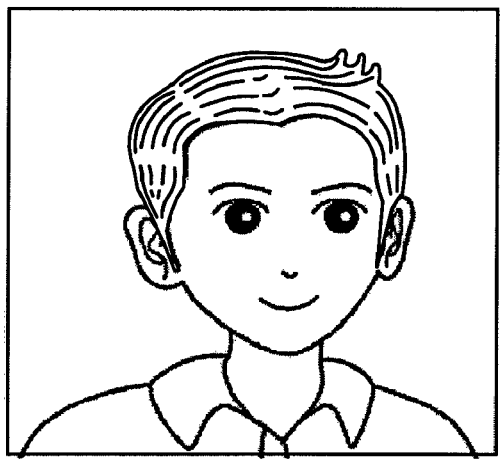 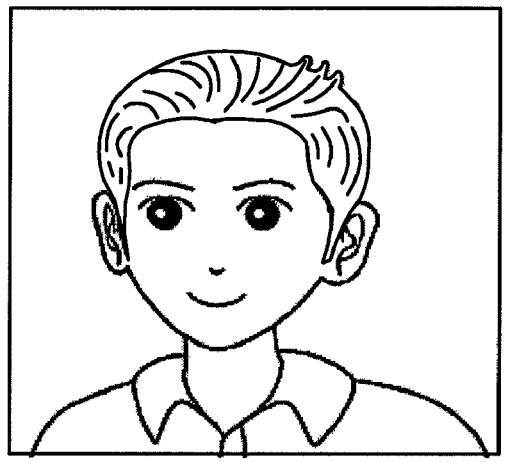
RELATED ART              RELATED ART
Fig. 27A                 Fig. 27B

INFORMATION PROCESSING APPARATUS, INFORMATION PROCESSING SYSTEM, AND CONVERSATION PARTNER DISPLAY METHOD WHILE PRESENTING A PICTURE

TECHNICAL FIELD

The present invention relates to an information processing apparatus such as a portable communication terminal capable of displaying an image of a conversation partner, an information processing system, and a conversation partner display method using the portable communication terminal, etc. More particularly, the present invention relates to an information processing apparatus in which when an image of a conversation partner is displayed, the eyes of the conversation partner are matched with the eyes of a terminal user, an information processing system, and a conversation partner display method using the portable communication terminal, etc.

BACKGROUND ART

Recently, portable communication terminals, such as cellular phones, have become quite popular. Those portable communication terminals are now equipped with not only the conversation function by speech, but also other various functions, e.g., transmission/reception of electronic mail, access to the Internet, and reception of a still image or a mobile image picked up by a camera on the conversation partner side. Nowadays, in addition to the cellular phones, two-way video communication systems connecting two distant places to each other via a video and voice communication network, such as a videoconference system and a videophone, have also expanded their use.

In some of the cellular phones and the two-way video communication systems, an image of the conversation partner is displayed on an image display disposed near a camera for taking a picture of the user's face, etc. The user of such a cellular phone and two-way video communication system usually makes conversation while looking at the image, e.g., the face of the conversation partner, displayed on the image display.

When an image pickup device, e.g., a camera, is mounted in a relatively small unit such as a cellular phone, the image pickup device is disposed outside an image display unit away in the right-and-left direction or the vertical direction. In such a case, even if the image display unit has a small size of, e.g., about 50 mm square, the eyes (line of sight) of the picked-up face image are not directed toward the image pickup device so long as the user looks at the image display unit where the conversation partner is displayed. As a result, that type of equipment displays, on the image display unit, the face image not matched in the line of sight. In that type of equipment, therefore, the user makes conversation with the conversation partner while looking at the face image not matched in the line of sight, thus resulting in the problems that unnaturalness is not avoidable and a realistic conversation impression is lost.

More practically, such a disadvantage can be explained as follows with reference to FIGS. 27A, 27B, 28A and 28B. FIGS. 27A, 27B, 28A and 28B show examples in which the direction of line of sight is not matched with respect to a face image on the image display unit of the terminal. Each of these examples shows an image picked up when a camera is disposed at a position 65 mm away from the center of the image display unit and the user looks at the center of the image display unit while his face is positioned at a distance of about 25 cm.

FIGS. 27A and 27B each illustratively shows an image that is picked up by a camera disposed leftward or rightward of the image display unit being about 50 mm square and is displayed on the image display unit. More specifically, FIG. 27A shows an image picked up by a camera that is disposed on the left side as viewed toward the image display unit, and FIG. 27B shows an image picked up by a camera that is disposed on the right side as viewed toward the image display unit. As seen from those drawings, the eyes of the face in each camera image are not directed toward the user from the image display unit, and hence the face image is unnatural in conversation.

Similarly, FIGS. 28A and 28B each illustratively shows an image that is picked up by a camera disposed above or below the image display unit being about 50 mm square and is displayed on the image display unit. More specifically, FIG. 28A shows an image picked up by a camera that is disposed on the upper side of the image display unit, and FIG. 28B shows an image picked up by a camera that is disposed on the lower side of the image display unit. In any of these cases, the eyes of the face in each camera image are not directed toward the user from the image display unit, and hence the face image is unnatural in conversation.

To overcome that unnaturalness, various eye-to-eye matching techniques have been proposed in the past.

According to one of those techniques, a small half mirror substantially in the form of a flat plate is disposed on the surface of an image display unit so that an image displayed on the image display unit passes the small half mirror for presenting display, while an image of the user is received by an image pickup camera which captures light reflected by the surface of the small half mirror. This technique can provide eye-to-eye matching display because the eyes of the user looking at the image display unit are matched with an optical axis of light incident upon the small half mirror before the light is reflected by the mirror.

According to another technique, by way of example, an image display unit having a light transmissible structure is provided and a camera is disposed on the backside of the image display unit relative to the user. This technique repeatedly brings the image display unit into a display state and a transmitted state in a time-division manner, and causes the camera to pick up an image of the user when the image display unit is in the transmitted state. Further, according to this technique, during a period other than the transmitted state, a desired video signal is sent to the image display unit and an image of the conversation partner is displayed. This technique can also provide eye-to-eye matching display because the direction of light emerging from the image display unit is matched with an optical axis of light passing through the image display unit and entering the camera disposed on the backside of the image display unit.

As still another technique, there is known a display and image pickup device as disclosed in Japanese Unexamined Patent Application Publication No. 4-167690. In this display and image pickup device, a number of small holes are formed all over the surface of an image display unit. One end of an optical fiber is positioned to face each of the small holes, and the other end of each optical fiber is connected to a camera. This display and image pickup device can also provide eye-to-eye matching display because the positional relationship between the ends of the optical fibers positioned to face the respective small holes and the image display unit is not offset.

While the above-mentioned known techniques are realized by aligning the image display unit with the optical axis of the image pickup device, it is further known, as a different type eye-to-eye matching technique, to synthesize eyes themselves by the use of computer graphics, as described in, e.g., "Tsuyoshi Yamaguchi et al., "Proposal for eye-to-eye matching technique in videoconference", Proceedings of Sixth Image Sensing Symposium, p267-p272, 2000".

In addition, a try to realize the eye-to-eye matching in a stereoscopic way is lately proposed (see, e.g., Japanese Unexamined Patent Application Publication No. 10-75432).

The Japanese Unexamined Patent Application Publication No. 10-75432 discloses a stereoscopic videophone in which image pickup units, constituted as cameras, and an image display unit are provided in a housing put on a table. The image display unit is constituted by using image splitter type three-dimensional liquid crystal display devices without spectacles, and the cameras are disposed in left-side and right-side positions of the image display unit.

Also, the Japanese Unexamined Patent Application Publication No. 10-75432 mentions that images picked up by the two cameras disposed in the left-side and right-side positions of the image display unit are selectively synthesized through fusion, whereby a front face image capable of providing a pseudo stereoscopic view can be obtained and users can make conversation in an eye-to-eye matching state.

In the above-mentioned various techniques realized by aligning the image display unit with the optical axis of the image pickup device, the image pickup device is arranged in some positional relationship relative to the image display unit.

More specifically, the above-described technique using the small half mirror requires the image pickup device to be positioned in the reflecting direction in which the light is reflected by the surface of the small half mirror. Also, the above-described technique of picking up a face image by using the light passing through the image display unit requires the camera to be disposed on the backside of the image display unit. To realize those techniques, therefore, the camera, etc. must be held by an apparatus having an increased overall size, and a difficulty exists in realizing those techniques in cellular phones, for example.

Also, in the device such as described in the above-cited Japanese Unexamined Patent Application Publication No. 4-167690 wherein optical fibers are attached to small holes formed in an image display unit, because of a difficulty in assembly steps of forming the small holes in the image display unit and inserting the ends of the optical fibers into the respective small holes in one-to-one relation, the product price is significantly increased.

Further, the technique of synthesizing the eyes of the communication partner by utilizing computer graphics, as described in the above-cited paper "Proposal for eye-to-eye matching technique in videoconference", dose not cause the above-mentioned problem attributable to the mount position of the image pickup device. At the current technology level of computer graphics, however, a synthesized image is still far from an actual one and unnaturalness in the line of sight of the communication partner cannot be yet completely eliminated.

Further, in the stereoscopic videophone disclosed in the above-cited Japanese Unexamined Patent Application Publication No. 10-75432, if the image display unit has a size of about 14 inches, for example, the distance from the left side to the right side of the image display unit in the lateral direction is about 30 cm. Therefore, when two cameras are disposed in positions not interfering with the image display unit, a relatively large shift occurs between two picked-up images. Consequently, the videophone has the problem that when those two images are used, as they are, for stereoscopic image, a parallax is too increased to synthesize such a double image, as it is, through fusion. Even if the double image can be synthesized through fusion, the resulting display imposes a burden on the user's eyes and makes the user feel fatigue.

The present invention has been accomplished in view of the state of the art set forth above, and its object is to provide, in relation to a portable information processing apparatus such as a portable communication terminal, an information processing apparatus, an information processing system, and a conversation partner display method, which can realize conversation in a natural eye-to-eye matching state with a conversation partner. Another object of the present invention is to provide an information processing apparatus, an information processing system, and a conversation partner display method, which can avoid the disadvantage resulting from a too large parallax between two picked-up images and which can realize conversation in a natural eye-to-eye matching state with a conversation partner.

DISCLOSURE OF THE INVENTION

To achieve the above objects, the present invention provides an image processing apparatus being portable and used for making conversation while presenting a picture, the image processing apparatus comprising image display means for displaying a desired image in accordance with an image signal; and image pickup means disposed respectively on the left and right sides of the image display means.

With that image processing apparatus according to the present invention, since the image pickup means are disposed respectively on the left and right sides of the image display means, the image pickup means on the right side takes in an image representing a scene looking from a rightward position in front of a user, and the image pickup means on the left side takes in an image representing a scene looking from a leftward position in front of the user. The image picked up from the left side and the image picked up from the right side are displayed together in image display means of a conversation-partner side terminal, for example, to provide display of the desired image. Thus, a person viewing the image display means is caused to look both the images at the same time, whereby the person visually perceives a synthesized image in a state that a shift of the line of sight in the left-and-right direction is compensated for. As a result, eye-to-eye matching display can be realized with no need of, particularly, aligning an optical axis of each image pickup means and an optical axis of the image display unit with each other.

Also, to achieve the above objects, the present invention provides an image processing apparatus being portable and used for making conversation while presenting a picture, the image processing apparatus comprising a portable housing; image display means mounted in a surface of the housing and displaying a desired image in accordance with an image signal; and image pickup means disposed on the surface of the housing respectively on the left and right sides of the image display means.

With that image processing apparatus according to the present invention, the image processing apparatus has a structure incorporated in the portable housing, and the image pickup means disposed respectively on the left and right sides are formed on a surface of the housing. Therefore, a thin structure can be realized as a whole, and the image processing apparatus can be constructed of a small-sized and lightweight housing.

Further, to achieve the above objects, the present invention provides an image processing apparatus being portable and used for making conversation while presenting a picture, the image processing apparatus comprising image display means including a mixed pattern of a plurality of pixels for making display in accordance with a left-eye signal and a plurality of pixels for making display in accordance with a right-eye signal; and image pickup means disposed respectively on the left and right sides of the image display means.

With that image processing apparatus according to the present invention, since the image pickup means are disposed respectively on the left and right sides of the image display means, the image pickup means can be mounted particularly with no need of aligning them with the position of the image display means, for example, with no need of an overlapped positional relationship, whereby a small-sized and thin structure can be realized as a whole. Also, since the image display means includes the mixed pattern of a plurality of pixels for making display in accordance with a left-eye signal and a plurality of pixels for making display in accordance with a right-eye signal, the user can continue conversation in an eye-to-eye matching state with the conversation partner without requiring a special device, e.g., polarization spectacles.

In particular, each of the above-mentioned image processing apparatuses in three modes according to the present invention preferably further comprises image processing means for producing new images with interpolation of a parallax based on two images picked up by the image pickup means, wherein the two new images produced by the image processing means are displayed on a display screen of the image display means.

With that feature, in the image processing apparatuses according to the present invention, a parallax between the two images picked up by the image pickup means is avoided from being too increased and hence from causing a trouble in display. As a result, stereoscopic display for eye-to-eye matching with the communication partner can be optimized, and a more natural, easier-to-see image can be provided.

Still further, to achieve the above objects, the present invention provides an information processing system comprising a plurality of portable information processing terminals used for making conversation while presenting a picture, each of the information processing terminals comprising image display means capable of displaying an image including a face of a conversation partner, and image pickup means disposed respectively on the left and right sides of the image display means, the information processing terminals being able to perform communication therebetween.

With that image processing system according to the present invention, since the image pickup means are disposed respectively on the left and right sides, the image pickup means on the right side takes in an image representing a scene looking from a rightward position in front of a user, and the image pickup means on the left side takes in an image representing a scene looking from a leftward position in front of the user. The image picked up from the left side and the image picked up from the right side are displayed together in image display means of an information processing terminal on the conversation partner side to provide display of the desired image. Thus, a person viewing the image display means is caused to look both the images at the same time, whereby a synthesized picture can be obtained in a state that eye-to-eye matching is held.

In particular, in the information processing system according to the present invention, each of the information processing terminals preferably further comprises image processing means for producing new images with interpolation of a parallax based on two images picked up by the image pickup means, and the two new images produced by the image processing means are displayed on the display screen of the image display means in the information processing terminal belonging to the conversation partner.

With that feature, in the information processing system according to the present invention, a parallax between the two images picked up by the image pickup means is avoided from being too increased and hence from causing a trouble in display. As a result, stereoscopic display for eye-to-eye matching with the communication partner can be optimized, and a more natural, easier-to-see image can be provided.

Still further, to achieve the above objects, the present invention provides a conversation partner display method comprising an image taking-in step of taking in images of a user by a pair of image pickup means disposed respectively on the left and right sides of the image display means in a portable terminal; and a display step of displaying the taken-in images on image display means of a terminal belonging to the conversation partner in eye-to-eye matching between the user and the conversation partner.

With that conversation partner display method according to the present invention, since the user's images are taken in by the pair of image pickup means, a signal representing a left-side image of the user and a signal representing a right-side image of the user are obtained. Those signals are sent to the image display means in the terminal belonging to the conversation partner such that pixels for the left-side image and pixels for the right-side image are displayed, for example, in a mixed way. As a result, eye-to-eye matching in display can be realized between the user and the conversation partner.

In particular, the conversation partner display method according to the present invention preferably further comprises an image processing step of producing new images with interpolation of a parallax based on two images taken in by the image taking-in step, wherein the two new images produced in the image processing step are displayed on the display screen of the image display means in the terminal belonging to the conversation partner.

With that feature, in the conversation partner display method according to the present invention, a parallax between the two images picked up by the image pickup means is avoided from being too increased and hence from causing a trouble in display. As a result, stereoscopic display for eye-to-eye matching with the communication partner can be optimized, and a more natural, easier-to-see image can be provided.

Still further, to achieve the above objects, the present invention provides an image processing apparatus used for making conversation while presenting a picture, the image processing apparatus comprising image display means for displaying a desired image in accordance with an image signal; image pickup means disposed respectively on the left and right sides of the image display means; and image processing means for producing new images with interpolation of a parallax based on two images picked up by the image pickup means, wherein the two new images produced by the image processing means are displayed on a display screen of the image display means.

With that image processing apparatus according to the present invention, the image pickup means are disposed respectively on the left and right sides of the image display means, new images are produced with interpolation of a parallax based on two images picked up by the image pickup means, and the two new images are displayed on the image display means. Therefore, eye-to-eye matching display can be realized with no need of, particularly, aligning an optical axis of each image pickup means and an optical axis of the image display unit with each other. In addition, since a parallax between the two images picked up by the image pickup means is avoided from being too increased and hence from causing a trouble, stereoscopic display for eye-to-eye matching with the communication partner can be optimized, and a more natural, easier-to-see image can be provided.

Still further, to achieve the above objects, the present invention provides an image processing apparatus used for making conversation while presenting a picture, the image processing apparatus comprising a housing; image display means mounted in a surface of the housing and displaying a desired image in accordance with an image signal; image pickup means disposed on the surface of the housing respectively on the left and right sides of the image display means; and image processing means for producing new images with interpolation of a parallax based on two images picked up by the image pickup means, wherein the two new images produced by the image processing means are displayed on a display screen of the image display means.

With that image processing apparatus according to the present invention, the image processing apparatus has a structure incorporated in the portable housing, and the image pickup means disposed respectively on the left and right sides are formed on a surface of the housing. Therefore, a thin structure can be realized as a whole, and the image processing apparatus can be constructed of a small-sized and lightweight housing.

Still further, to achieve the above objects, the present invention provides an image processing apparatus used for making conversation while presenting a picture, the image processing apparatus comprising image display means including a mixed pattern of a plurality of pixels for making display in accordance with a left-eye signal and a plurality of pixels for making display in accordance with a right-eye signal; image pickup means disposed respectively on the left and right sides of the image display means; and image processing means for producing new images with interpolation of a parallax based on two images picked up by the image pickup means, wherein the two new images produced by the image processing means are displayed on a display screen of the image display means.

With that image processing apparatus according to the present invention, since the image pickup means can be mounted particularly with no need of aligning them with the position of the image display means, for example, with no need of an overlapped positional relationship, a small-sized and thin structure can be realized as a whole. Also, the image display means includes the mixed pattern of a plurality of pixels for making display in accordance with a left-eye signal and a plurality of pixels for making display in accordance with a right-eye signal, and the images newly produced with interpolation of a parallax based on the two images picked up by the image pickup means are displayed. Therefore, stereoscopic display for eye-to-eye matching with the communication partner can be optimized without requiring a special device, e.g., polarization spectacles, and the user can continue conversation in an eye-to-eye matching state with the conversation partner while looking a more natural, easier-to-see image.

Still further, to achieve the above objects, the present invention provides an information processing system comprising a plurality of portable information processing terminals used for making conversation while presenting a picture, each of the information processing terminals comprising image display means capable of displaying an image including a face of a conversation partner, and image pickup means disposed respectively on the left and right sides of the image display means, wherein each of the information processing terminals further comprises image processing means for producing new images with interpolation of a parallax based on two images picked up by the image pickup means, and the two new images produced by the image processing means are displayed on the display screen of the image display means in the information processing terminal belonging to the conversation partner when communication is performed between the information processing terminals.

With that image processing system according to the present invention, since the image pickup means are disposed respectively on the left and right sides, the image pickup means on the right side takes in an image representing a scene looking from a rightward position in front of a user, and the image pickup means on the left side takes in an image representing a scene looking from a leftward position in front of the user. The image picked up from the left side and the image picked up from the right side are displayed together in image display means of an information processing terminal on the conversation partner side to provide display of the desired image. At this time, since the image display means displays the images newly produced with interpolation of a parallax based on the two images picked up by the image pickup means, stereoscopic display for eye-to-eye matching with the communication partner can be optimized, and a much easier-to-see, natural image can be provided in an eye-to-eye matching state.

Still further, to achieve the above objects, the present invention provides a conversation partner display method comprising an image taking-in step of taking in images of a user by a pair of image pickup means disposed respectively on the left and right sides of image display means in a terminal; an image processing step of producing new images with interpolation of a parallax based on two images taken in by the image taking-in step; and a display step of displaying the two new images produced in the image processing step on image display means of a terminal belonging to a conversation partner such that eye-to-eye matching in display is held between the user and the conversation partner.

With that conversation partner display method according to the present invention, the user's images are taken in by the pair of image pickup means, and new images are produced with interpolation of a parallax based on the two picked-up images, whereby a signal representing a left-side image of the user and a signal representing a right-side image of the user are obtained. Those signals are displayed on the image display means of the terminal belonging to the conversation partner such that pixels for the left-side image and pixels for the right-side image are displayed, for example, in a mixed way. As a result, stereoscopic display for eye-to-eye matching with the communication partner can be optimized, and eye-to-eye matching in display can be realized between the user and the conversation partner.

BRIEF DESCRIPTION OF THE DRAWINGS

FIGS. 9A to 9E show array pattern examples of left-eye pixels (L) and right-eye pixels (R) of the image display unit in one example of the information processing apparatus of the present invention.

FIGS. 13A and 13B are illustrations showing spreading of a light beam by the light emitting device and the microlens in one example of the information processing apparatus of the present invention, in which FIG. 13A shows a simulation result of spreading of a light beam when the axis of the light emitting device and the axis of the microlens are aligned with each other, and FIG. 13B shows a simulation result of spreading of a light beam when the axis of the light emitting device and the axis of the microlens are not aligned with each other.

FIGS. 14A to 14C are graphs showing optical calculation results depending on the size and positional relation of the light emitting device and the microlens in one example of the information processing apparatus of the present invention, in which FIG. 14A is a graph showing an optical calculation result of the relationship between a diameter of the light emitting device and a light spreading angle, FIG. 14B is a graph showing a calculation result of the relationship between a lens position in the direction of an optical axis and spreading of a light beam, and FIG. 14C is a graph showing a calculation result of the relationship between a position of the light emitting device in the in-plane direction and a light exit angle.

FIGS. 15A and 15B show an example of the microlenses used in one example of the information processing apparatus of the present invention, in which FIG. 15A is a front view and FIG. 15B is a sectional view.

FIGS. 18A and 18B show the image display unit in another example of the information processing apparatus of the present invention, in which FIG. 18A is a sectional view of a portion near a light emitting device and a cone-shaped microlens, and FIG. 18B is a perspective view of the cone-shaped microlens.

FIGS. 22A and 22B are illustrations showing schemes of experiments to examine the relationship between the direction of line of sight and an impression of an eye-to-eye matching, in which FIG. 22A shows the case in which a stereoscopic image is provided, and FIG. 22B shows the case in which a monaural image is provided.

FIGS. 23A and 23B are graphs showing results of the experiments shown in FIGS. 22A and 22B, in which FIG. 23A shows the case in which a stereoscopic image is provided, and FIG. 23B shows the case in which a monaural image is provided.

FIG. 26 is an illustration showing one example of an image produced by moving an original image by the number of pixels corresponding to ½ of a shift representing a parallax, the view being referenced to explain a process of producing an image comparable to that picked up from a position at the middle of the two cameras used for picking up the two images.

FIGS. 27A and 27B are each an illustration showing a display unit image when an object image is picked up by a camera disposed one of the left and right sides of a screen having a substantially predetermined square size, in which FIG. 27A shows the case in which the camera is disposed on the left side, and FIG. 27B shows the case in which the camera is disposed on the right side.

FIGS. 28A and 28B are each an illustration showing a display unit image when an object image is picked up by a camera disposed one of the upper and left sides of a screen having a substantially predetermined square size, in which FIG. 28A shows the case in which the camera is disposed on the upper side, and FIG. 28B shows the case in which the camera is disposed on the lower side.

BEST MODE FOR CARRYING OUT THE INVENTION

A practical embodiment implementing the present invention will be described in detail below with reference to the drawings.

Figure 1:
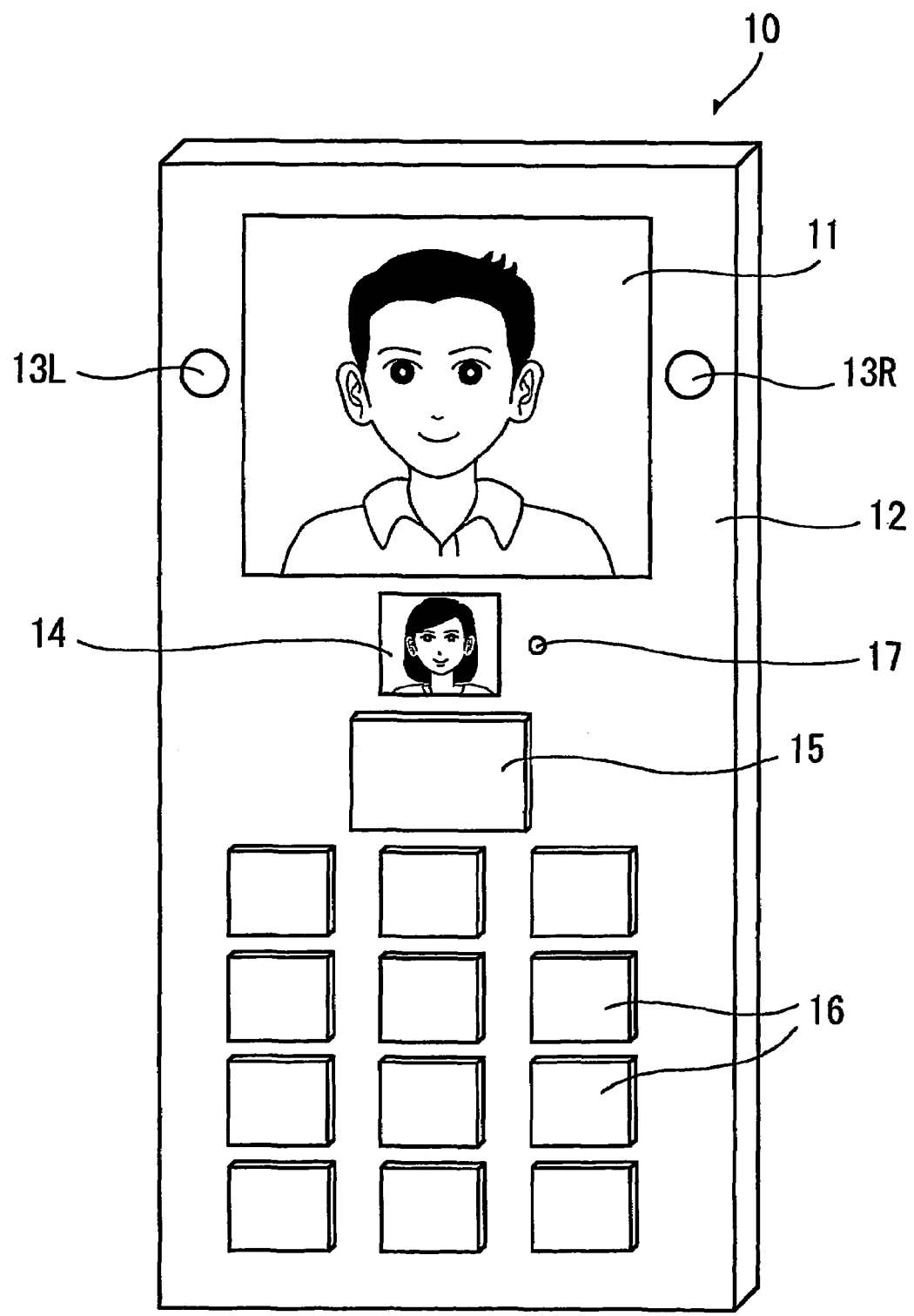
FIG. 1 is a schematic view of one example of an information processing apparatus of the present invention.

This embodiment relates to a portable communication terminal capable of displaying a face image of a conversation partner. As shown in FIG. 1, a portable communication terminal 10 serving as an information processing apparatus has a housing 12 with a size allowing a user to hold it by one hand, and enables the user to make conversation while holding the housing 12 with the lengthwise direction of the housing 12 oriented vertically. An image display unit 11 with a size in the range of about 10 mm square to 100 mm square is disposed on the front side of the housing 12 such that its display screen is exposed to the outside. A left camera 13L and a right camera 13R each serving as an image pickup unit are disposed respectively on the left and right sides of the image display unit 11. Further, a minor monitor 14 for monitoring an image condition of a user's face, etc. is disposed below the image display unit 11, and an indicator 17 is disposed laterally of the minor monitor 14. When the user's face is deviated far away from an image pickup area, the indicator 17 is blinked, for example, to indicate that fact. A button 15 and input keys 16 are arranged below the minor monitor 14. In the portable communication terminal 10, with operation of the button 15 and the input keys 16, the user can, for example, dial the phone number, enter characters for electronic mail, and control the functions of the portable communication terminal 10.

The left camera 13L and the right camera 13R each serving as an image pickup unit are disposed respectively on the left and right sides of the image display unit 11. The left camera 13L is disposed to pick up a picture from a position in front of the user holding the portable communication terminal 10 slightly offset to the left, and the right camera 13R is disposed to pick up a picture from a position in front of the user slightly offset to the right. The left camera 13L and the right camera 13R are each constituted as an optical system in a combination of a MOS (Metal-Oxide Semiconductor) image pickup device or a CCD (Charge Coupled Device) image pickup device with a lens, etc. Practically, in the portable communication terminal 10, a small-sized and lightweight solid-state image pickup device is used, by way of example, as each of the left camera 13L and the right camera 13R.

The image display unit 11 is constituted as including a mixed pattern of a plurality of pixels for making display in accordance with a left-eye signal and a plurality of pixels for making display in accordance with a right-eye signal. Particularly, the image display unit 11 includes output means for outputting lights to both eyes of the user independently of each other. In this embodiment, the output means comprises a light emitting portion for emitting desired light in accordance with the left-eye signal or the right-eye signal, and an exit angle control portion for controlling light from the light emitting portion to exit in the direction of a predetermined angle. The light emitting portion is constituted by a plurality of light emitting diodes in an array, and the exit angle control portion is constituted as a microlens array formed by arraying a plurality of small lenses in a matrix pattern. The above-described structure of the output means is merely one example, and the structure of the light emitting portion may be constituted, as other examples, by using liquid crystal display devices, organic EL (Electronic Luminescent) devices, plasma display devices, etc., or by employing a transmitted or reflecting structure. The exit angle control portion can also be modified to any suitable one of various structures as described later. A method of forming the mixed pattern of a plurality of pixels for making display in accordance with the left-eye signal and a plurality of pixels for making display in accordance with the right-eye signal will be described later.

A technique for sending respective signals with respect to both the eyes to one display unit for eye-to-eye matching will be first described. Generally, a detection eye and an allowance eye with respect to misalignment of the line of sight have been studied in the field of videophones or the likes as discussed in, e.g., "Sato et al., No. 1998, "Studies on position of image pickup tube in videophone", 1972 of Joint Meeting of Four Electrical Societies in Japan, p2316 and "Minami, "4.2 Videophone", Journal of the Institute of Electronics and Communication Engineers in Japan, 11/'73, Vol. 56, No. 11, p1485-p1490". Those references show discussions and experimental results regarding alignment of the line of sight in videophones, and mention that "a detection eye capable of detecting an unusual feeling in the line of sight as the human sense is in a very narrow range of about 2° to 3° from the center, and there is no appreciable difference between the horizontal direction and the vertical direction". Further, those references mention that "an allowance eye providing a limit of the allowable range in videophones varies such that a limit angle is about 4.5° in the horizontal direction, 12° in the exactly upward vertical direction, and 8° in the exactly downward vertical direction, and that since the allowable range is narrow particularly in the horizontal direction, the human being is sensitive to the line of sight in the left-and-right direction".

Figure 2A:
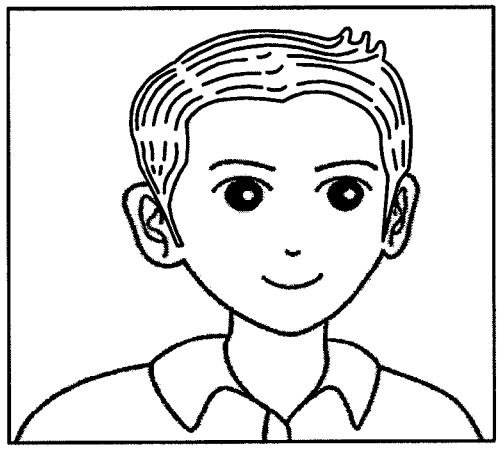
FIGS. 2A to 2C are illustrations for explaining the principle of one example of the information processing apparatus of the present invention.
Figure 2B:
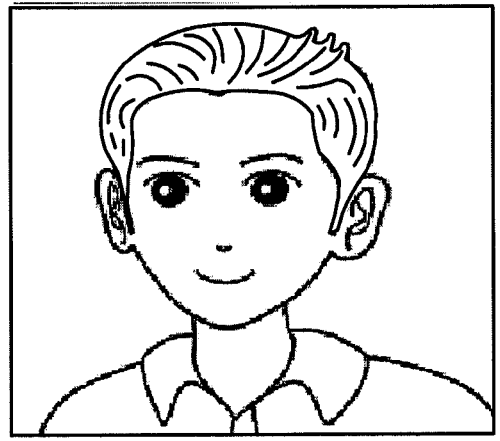
Figure 2C:
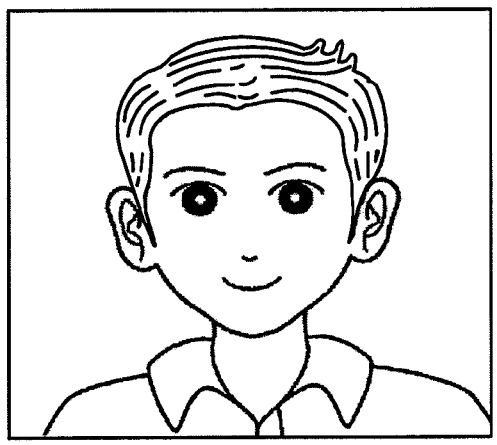

The portable communication terminal 10 shown as the embodiment of the present invention is an apparatus capable of compensating for a shift in the line of sight in the left-and-right direction that is relatively easily sensible, and realizing communication with satisfactory realism. FIGS. 2A to 2C are illustrations for simply showing the concept of realizing such an apparatus. FIG. 2A shows an image viewed from the left camera 13L. Because the left camera 13L is positioned on the left side offset from the center, the line of sight of the user appears offset to the right. Also, FIG. 2B shows an image viewed from the right camera 13R. Because the right camera 13R is positioned on the right side offset from the center, the line of sight of the user appears offset to the left. Further, FIG. 2C shows a display unit resulting when an image is displayed by using the image display unit 11 which includes the mixed pattern of a plurality of pixels for making display in accordance with the left-eye signal and a plurality of pixels for making display in accordance with the right-eye signal and which has a mechanism for outputting lights to both the eyes of the user independently of each other. Stated another way, the portable communication terminal 10 outputs light toward the left eye of the user from each pixel of the image display unit 11 to which the left-eye signal is dedicatedly sent, and the output light reaches the left eye of the user. Similarly, the portable communication terminal 10 also outputs light toward the right eye of the user from each pixel of the image display unit 11 to which the right-eye signal is dedicatedly sent, and the output light reaches the right eye of the user. As a result, the user looks different images by both the eyes. However, the function of looking those images as a synthesized one works in the cerebrum of the user, and hence the user can see the images as if an eye-to-eye matching image is displayed on the screen, as shown in FIG. 2C, so that communication can be realized in a natural eye-to-eye matching state. The image may be a still picture or a mobile picture. When the portable communication terminal 10 has an allowance in band for transmission/reception, a real-time mobile picture can also be transmitted and received. Additionally, compressed or thinned-out image data may be transmitted and received.

Figure 3:
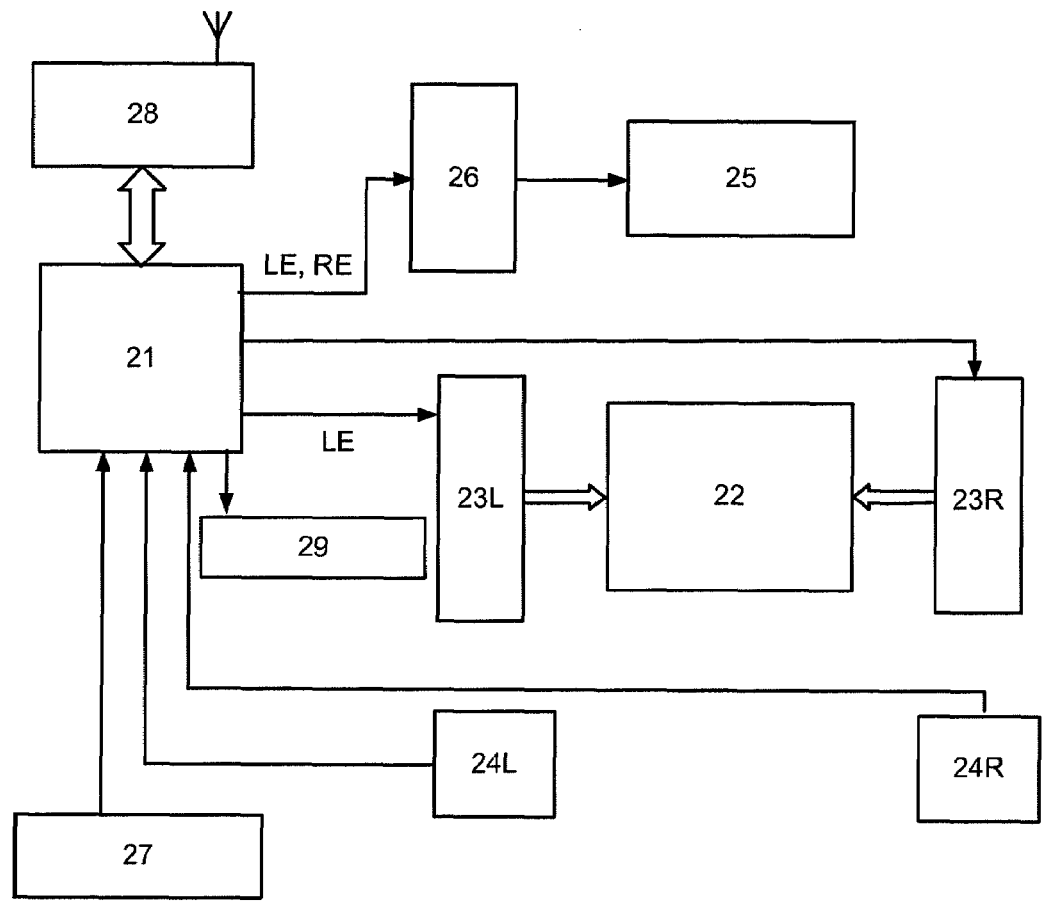
FIG. 3 is a block diagram showing a schematic circuit configuration of one example of the information processing apparatus of the present invention.

FIG. 3 is a block diagram showing an example of circuit configuration of the portable communication terminal 10. A control circuit 21 includes a CPU (Central Processing Circuit), a video memory, and an image information processing circuit having required specifications. As described later, the control circuit 21 also executes signal processing to prevent an effect of hand wobbling. Data processed by the control circuit 21 can be transmitted via a transmitting/receiving unit 28, and data received by the transmitting/receiving unit 28 is sent to the control circuit 21. A key input unit 27 has, for example, ten keys and function setting buttons arranged on it. In addition, a jog dial, an input pad, another add-on functional device, etc. may also be arranged on the key input unit 27.

A signal from the left camera 24L and a signal from the right camera 24R are independently supplied to the control circuit 21. In an ordinary state in use, the signal from the left camera 24L contains image data picked up from a position in front of the user slightly offset to the left, and the signal from the right camera 24R contains image data picked up from a position in front of the user slightly offset to the right. In the portable communication terminal 10, the signals from the left camera 24L and the right camera 24R are transmitted to the transmitting/receiving unit 28 via the control circuit 21. Those signals are transmitted from the transmitting/receiving unit 28 and received by another portable communication terminal. The portable communication terminal 10 enables the user to make conversation through the above-described transmission and reception of data. Particularly, with this embodiment, the user can look the received data as if an eye-to-eye matching image is displayed on the image display unit 11, and hence communication is realized in a natural eye-to-eye matching state.

The signals from the left camera 24L and the right camera 24R are not only sent to another portable communication terminal, but also used to display an image on a small monitor screen via the control circuit 21. More specifically, the signals from the left camera 24L and the right camera 24R are also sent to a minor monitor 25 via the control circuit 21 and a driver 26. As a result, the user can look his or her face on a relatively small screen, e.g., the minor monitor 14 shown in FIG. 1, of the portable communication terminal 10 while making conversation. When the user makes conversation without confirming his or her face on the relatively small screen, e.g., the minor monitor 14, there is a possibility depending on an angle of the portable communication terminal 10 that the user's face cannot be captured at the center of any of the left camera 24L and the right camera 24R, or that the user's face is deviated from the image pickup range of the camera. By making conversation while confirming the image on the minor monitor 25, the user of the portable communication terminal 10 can continue the conversation in a natural eye-to-eye matching state with the conversation partner. Thus, the minor monitor 25 is a device for prompting visual confirmation. In the portable communication terminal 10, since the signals from the left camera 24L and the right camera 24R are subjected to steady image processing, such as hand wobbling preventive processing, in the control circuit 21, the indicator 29 may be blinked when the user's face is not properly displayed. Alternatively, control may be executed to display that condition on the screen of the minor monitor 25 or a main monitor 22.

A signal from the conversation partner is sent to the control circuit 21 from the transmitting/receiving unit 28 and is output from the control circuit 21 after being separated into a signal LE for the left eye and a signal RE for the right eye. The left-eye signal LE is sent to a left-eye driver 23L for driving pixels for the left eye, and the right-eye signal RE is sent to a right-eye driver 23R for driving pixels for the right eye. The main monitor 22 for displaying the face of the conversation partner is driven by both the signals from the left-eye driver 23L and the right-eye driver 23R. On the main monitor 22, as described above, the left-eye pixels and the right-eye pixels are arrayed in a mixed pattern, for example, such that pixels in even lines are for the right eyes and pixels in odd lines are for the left eye, and therefore different images are independently displayed per group of pixels. On the side looking the main monitor 22, however, the function of looking the different images as a synthesized one works in the cerebrum of the user, and hence the user can see the images as if an eye-to-eye matching image is displayed on the screen, as shown in FIG. 2C, so that communication can be realized in a natural eye-to-eye matching state.

Note that the block diagram of FIG. 3 merely shows one example of the portable communication terminal 10 and may have any other suitable circuit configuration. For example, in the portable communication terminal 10, only one of the left-eye signal LE and the right-eye signal RE may be sent to both the drivers 23L, 23R with, e.g., button operation. Alternatively, the signal for the main monitor 22 and the signal for the minor monitor 25 may be controlled to change over with, e.g., button operation so that the user's face is displayed on the main monitor 22 in an eye-to-eye matching state. Also, the portable communication terminal 10 may be modified so as to produce voices in a stereoscopic manner in addition to the image. Furthermore, in the portable communication terminal 10, the left-eye signal and the right-eye signal may be reproduced only when an occasion requires, and an image may be displayed with a signal not dedicated for the left eye or the right eye in the ordinary case.

Figure 4:
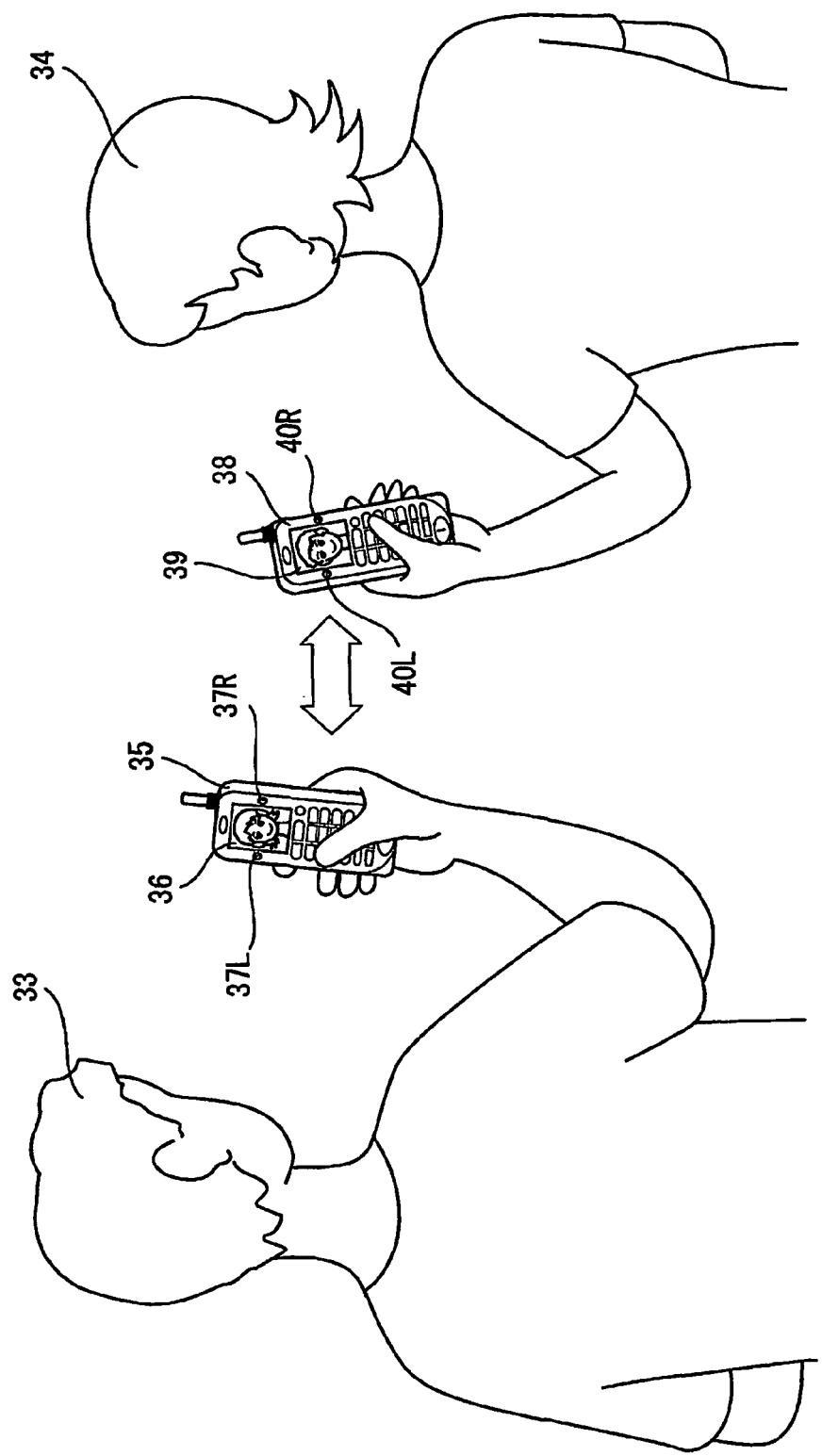
FIG. 4 is an illustration showing a state in use of a system employing the information processing apparatuses of the present invention.

FIG. 4 is an illustration showing a situation in which two persons are talking through two portable communication terminals 35, 38 each having the same construction as the portable communication terminal 10 described above. Assuming, in FIG. 4, that a user 33 and a conversation partner 34 are communicating with each other, the portable communication terminal 35 held by the user 33 is equipped with an image display unit 36 and a pair of cameras 37L, 37R. The face of the conversation partner 34 is displayed on the image display unit 36, and a displayed face image is in a natural eye-to-eye matching state based on the principle described above with reference to FIGS. 2A to 2C. On the other hand, the portable communication terminal 38 held by the conversation partner 34 is equipped with an image display unit 39 and a pair of cameras 40L, 40R. The face of the user 33 is displayed on the image display unit 38, and a displayed face image is similarly in a natural eye-to-eye matching state based on the principle described above with reference to FIGS. 2A to 2C.

Figure 5:
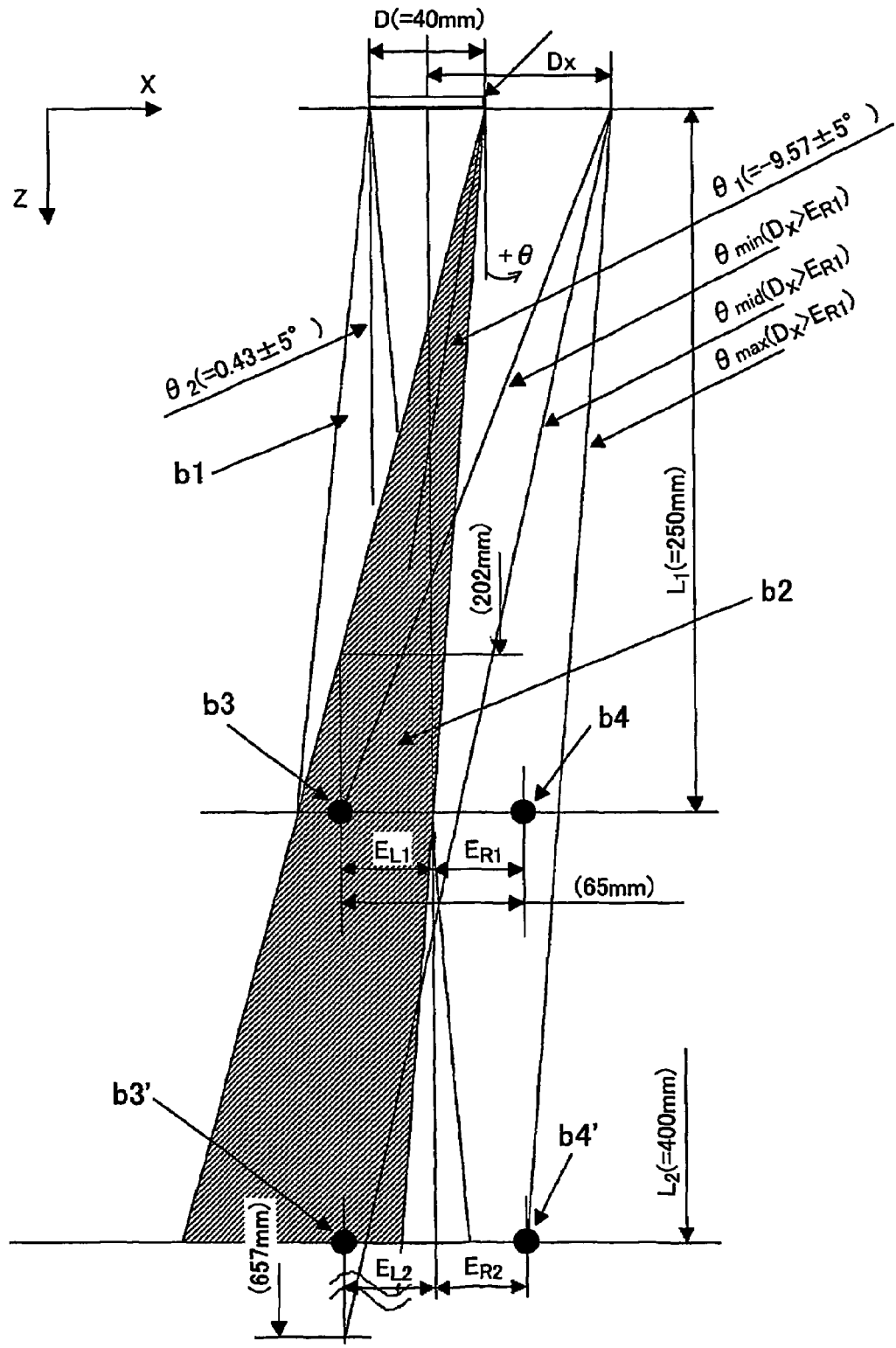
FIG. 5 is a chart (in the x-direction) for explaining an emergence angle of a light beam from an image display unit of the information processing apparatus of the present invention.
Figure 6:
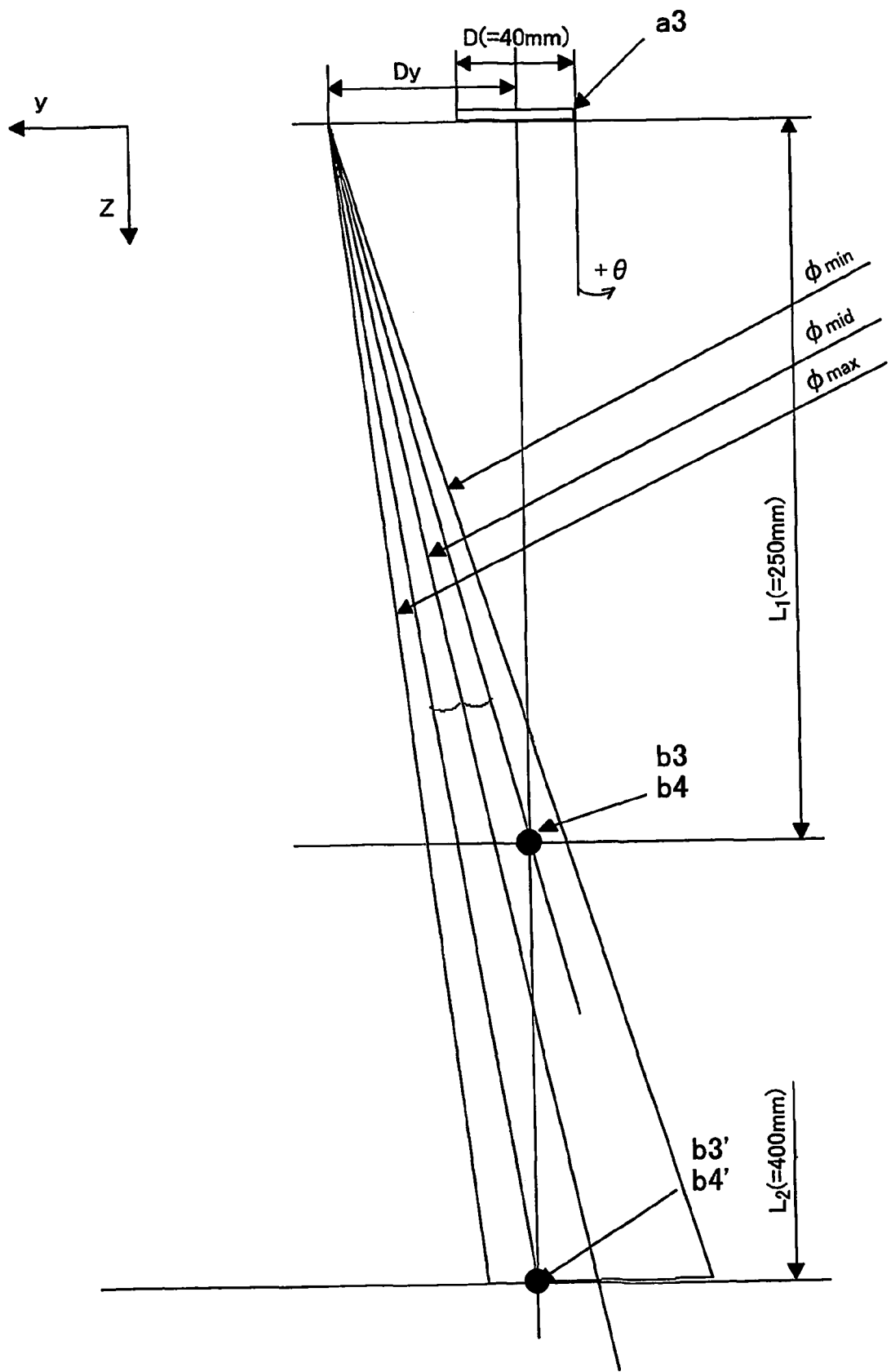
FIG. 6 is a chart (in the y-direction) for explaining an emergence angle of a light beam from the image display unit of the information processing apparatus of the present invention.

With reference to FIGS. 5 and 6, a description is now made of a structure for controlling light emitted from the light emitting portion of the image display unit in the portable communication terminal of this embodiment to exit in the direction of a predetermined angle.

FIG. 5 is a chart looking, from above, the image display unit of the portable communication terminal of this embodiment.

In FIG. 5, an area b1 represents a range where light radiated from or reflected by a pixel at a left end of a display screen of the image display unit is sufficiently strong for permitting the user to clearly view it. Likewise, an area b2 represents a range where light radiated from or reflected by a pixel at a right end of the display screen of the image display unit is sufficiently strong. Between those two pixels, an angle θ is continuously changed such that corresponding light ranges are almost overlapped with each other in a plane at a distance $L_1$ away from the display screen of the image display unit. The distance $L_1$ is a dimension assumed to be a distance at which the user looks the display screen in the ordinary case. Herein, the distance $L_1$ is supposed to be 250 mm, i.e., the so-called distance of distinct vision for the human being. Also, a distance $L_2$ is a dimension assumed in consideration of the case that the user looks the display screen while stretching the arm. Herein, the distance $L_2$ is supposed to be 400 mm. Black points b3, b4 represent respective positions of a left eye $E_{L1}$ and a right eye $E_{R1}$ of the user at the distance $L_1$ who looks the display screen of the portable communication terminal. Further, black points b3', b4' represent respective positions of both the eyes at the distance $L_2$.

As is apparent from FIG. 5, the lights in the areas b1, b2 do not enter the right eye, and can be seen only by the left eye. Likewise, pixels capable of been seen only by the right eye can be set by reversing the light angle in the left-and-right direction. Accordingly, a stereoscopic view can be obtained by displaying respective images for the left eye and the right eye per line or pixel with respect to all the display pixels.

A distance D is a dimension of the display screen of the image display unit in the horizontal direction. In general, the image display unit of portable equipment has a width from about 20 mm to 80 mm to meet a demand for a hand-held unit. In this example, the distance D is supposed to be 40 mm. Also, $\theta_1(=-9.57\pm5°)$ and $\theta_2(=0.43\pm5°)$ are design reference values in this example and are set on an assumption of light spreading being 10° so that light sufficiently reaches the eye, while ensuring that the lights for both the eyes are neither mixed nor spaced away from each other as far as possible at the middle between both the eyes at a position of $L_1$=250 mm. Those design values also allow light to sufficiently reach the eye even at the distance $L_2$ of 400 mm. The distance at which a part of the display screen disappears theoretically under that setting is 202 mm at minimum and 657 mm at maximum based on the geometry. The light spreading angle may be larger than 10° so long as the lights reaching both the eyes are separable from each other. However, a larger spreading angle requires a larger light exit angle and raises a difficulty in optical design. Further, because the equipment as an application of the present invention is assumed to be a personal user, not spreading the light more than necessary is advantageous from the viewpoints of privacy protection and a reduction of energy consumption.

Regarding the vertical direction, as shown in FIG. 6, control is similarly performed so that light reaches the eye position. In the vertical direction, an angle $\phi$ is used as an angle parameter for the exit direction. Since it is assumed that there is no positional difference between both the eyes, the black points b3, b4 are located at the same position ($L_1$) and the black points b3', b4' are located at the same position ($L_2$).

While such a design process enables the image display unit to be capable of displaying an image in an eye-to-eye matching state, it can be further generalized using formulae given below. First, a distance $E_{R1}$ corresponding to half of the spacing between both the eyes is compared with a distance $Dx_{max}$ from the center to the end of the display screen of the image display unit. In other words, a comparison is made as expressed by the following formulae (1):

$$\text{if } Dx_{max} < E_{R1}$$

$$\text{if } Dx_{max} > E_{R1} \quad (1)$$

If the upper condition of the formulae (1) is satisfied, this indicates the case that the distance $Dx_{max}$ from the center to the end of the display screen of the image display unit is shorter than the distance $E_{R1}$ corresponding to half of the spacing between both the eyes, i.e., the case that the display screen of the image display unit has a small size. In this case, the light exit angles are set as expressed by the following formulae (2):

$$\theta_{L\,max} = -\tan^{-1}(Dx/L_1)$$

$$\theta_{L\,min} = \theta_{max} - 10$$

$\theta_{Rmax}, \theta_{Rmin}$ are symmetrical about center (yz-plane)

$$\phi_{mid} = (-\tan^{-1}(Dy/L_1) - \tan^{-1}(Dx/L_2))/2$$

$$\phi_{max} = \phi_{mid} + 5$$

$$\phi_{max} = \phi_{mid} - 5 \quad (2)$$

In the formulae (2), the distance $L_1$ is a dimension assumed to be a distance at which the user looks the display screen in the ordinary case, e.g., the distance of distinct vision for the human being. Also, the distance $L_2$ is a dimension assumed in consideration of the case that the user looks the display screen while stretching the arm. Further, the distance Dx is a distance in the x-direction (horizontal direction), and the distance Dy is a distance in the y-direction (vertical direction). Stated another way, calculation can be made on an assumption that a pixel for which the direction of the exit angle is to be determined is positioned at (Dx, Dy).

On the other hand, if the lower condition of the formulae (1) is satisfied, this indicates the case that the distance $Dx_{max}$ from the center to the end of the display screen of the image display unit is larger than the distance $E_{R1}$ corresponding to half of the spacing between both the eyes, i.e., the case that the display screen of the image display unit has a large size. In this case, the light exit angles are set as expressed by the following formulae (3):

$$\theta_{L\,max} = -\tan^{-1}((Dx - E_{R2})/L_1)$$

$$\theta_{L\,min} = -\tan^{-1}((Dx - E_{L1})/L_2)$$

$\theta_{Rmax}, \theta_{Rmin}$ are symmetrical about center (yz-plane)

$$\phi_{mid} = (-\tan^{-1}(Dy/L_1) - \tan^{-1}(Dx/L_2))/2$$

$$\phi_{max} = \phi_{mid} + 5$$

$$\phi_{max} = \phi_{mid} - 5 \quad (3)$$

In the formulae (3), each parameter has the same setting as that in the formulae (2).

By using the formulae (1) to (3), it is possible to determine the direction of the light exit angle at an arbitrary position (Dx, Dy) on the image display unit. If the relationship in correspondence between the pixels and the right eye or the left eye is at random, the exit direction can be determined for each pixel by calculation using the formulae (1) to (3). As another example, if the right-eye pixels and the left-eye pixels are alternately arrayed per line, the exit direction may be set such that several points on each line are extracted and a similar calculation is executed for each of the points by using the formulae (1) to (3), while other points than the extracted ones are each set by a linear interpolation or another suitable process based on data of the exit angle for the extracted points.

Camera positions in the portable communication terminal of this embodiment will be described below with reference to FIG. 7.

An image display unit 31 is of a structure comprising many pixels arrayed in a matrix pattern and has a substantially rectangular outer contour. Cameras are disposed at least one on each of the left and right sides. As another example, a larger number of cameras may be disposed, or different types of cameras may be disposed. In the latter case, a combination may be such that one of the left and right cameras is an ordinary camera, and the other camera is a relatively simplified one for the purpose of just synthesizing the line of sight.

Figure 7:
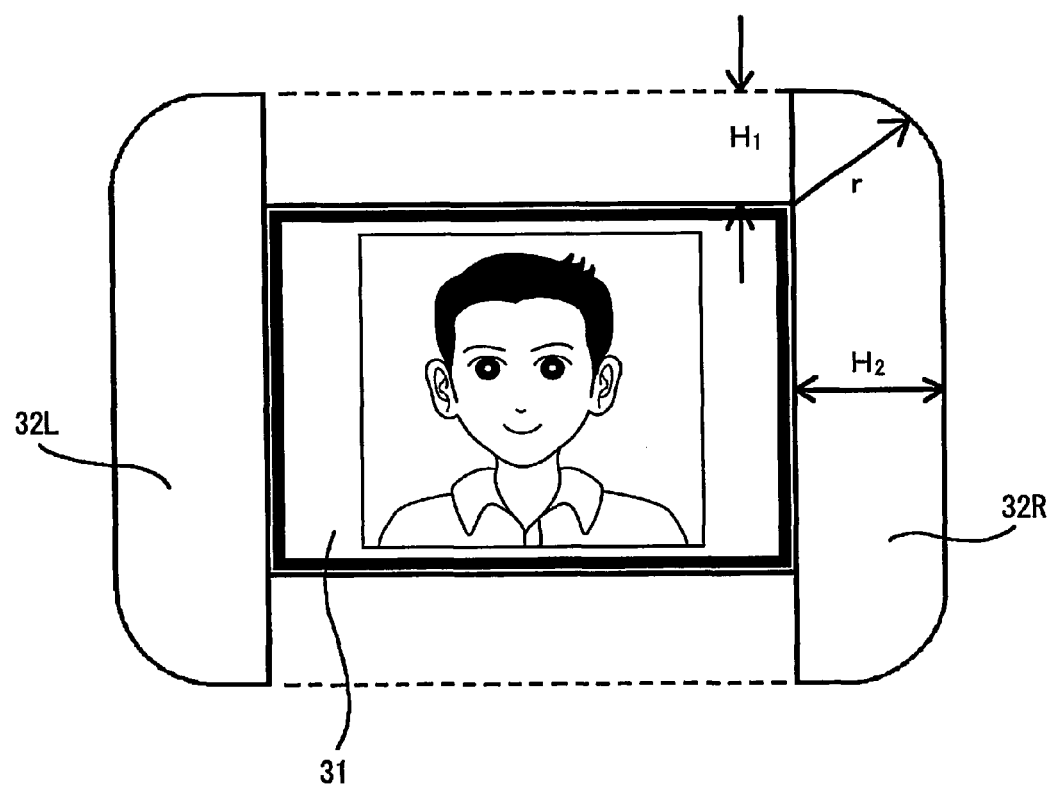
FIG. 7 shows a camera mount position around the image display unit in one example of the information processing apparatus of the present invention.

Each of the cameras can be disposed in one of areas 32L, 32R shown in FIG. 7, by way of example, including not only positions horizontally aside from left and right side ends of the image display unit 31 having a substantially rectangular shape, but also positions within a predetermined range away from upper and lower ends of the left and right side ends. More specifically, the areas 32L, 32R shown in FIG. 7 include not only band-like zones horizontally extending from the left and right side ends of the image display unit 31 and having a width $H_2$, but also zones each extending vertically from one of upper and lower ends of those band-like zones and defined by a circle with a radius r, for example, about the corresponding corner of the rectangular image display unit 31. Thus, in the direction of height, each of the areas 32L, 32R includes a zone extending upward from the rectangular image display unit 31 by a distance $H_1$. The reason why there is a relatively large degree in freedom for the camera position in the vertical direction is that the above-mentioned allowance eye has a not so severe limit in the vertical direction. In the case of the portable communication terminal that has a small space other than the display unit, the camera position is not always limited to a position exactly laterally of the image display unit 31. The above description is similarly applied to the lower side.

The width $H_2$ is not limited to a particular value. For example, when the radius r is set to about 20 mm, the width $H_2$ can also be set to about 20 mm. The above-described camera position is desirably fixed relative to the image display unit 31 because each camera is equipped with an optical system (not shown). Alternatively, the structure may be modified such that the camera is able to project and retract from the side of the image display unit 31, or that both or one of a pair of cameras is mounted in place when an image is picked up. A lens made of glass or plastic is attached to a fore end of the camera. To prevent the lens from being damaged, for example, the camera may be covered with a cover when not used.

Examples of the structure of the image display unit will be next described with reference to FIGS. 8 to 12.

Figure 8:
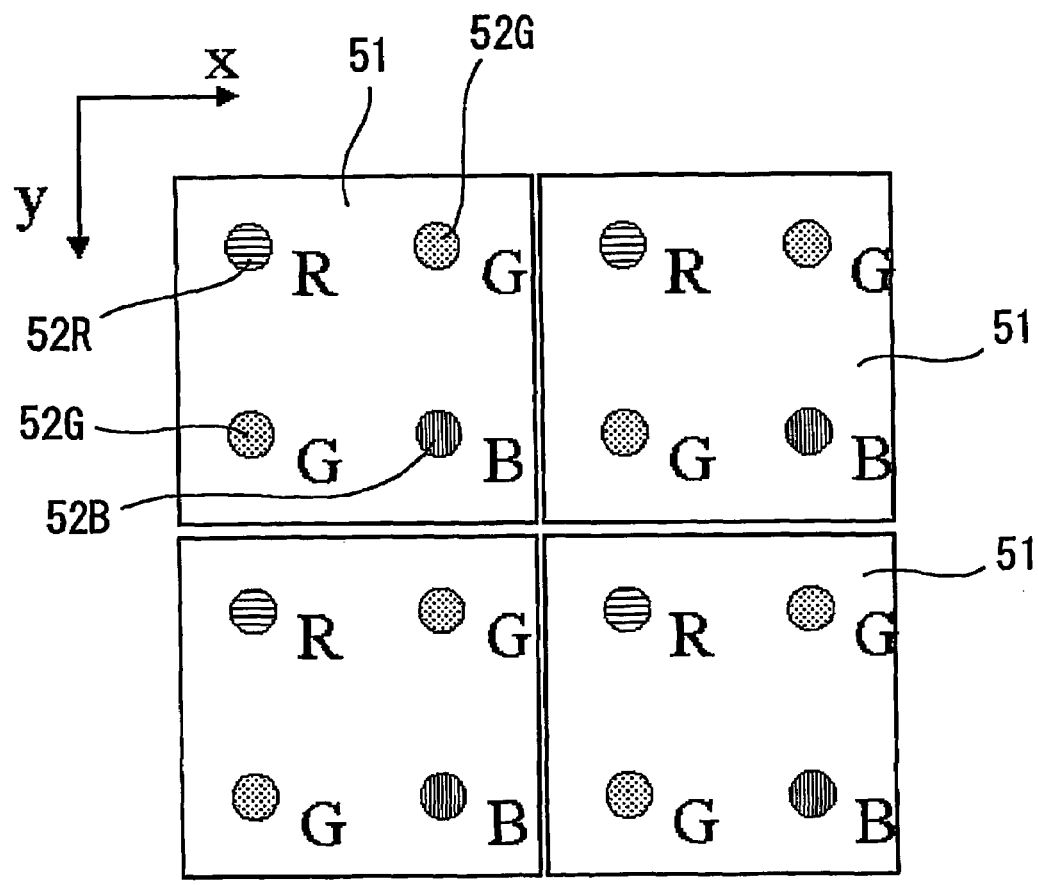
FIG. 8 is an illustration showing a pixel arrangement of the image display unit in one example of the information processing apparatus of the present invention.

FIG. 8 shows a display pixel in an enlarged scale. In FIG. 8, an area 51 indicated by a substantially square block corresponds to one pixel. In the area 51 of each pixel, four light emitting devices 52R, 52G, 52B and 52G are disposed so as to position at four points in one surface of a die, respectively, which represents a number 4. The light emitting devices 52R, 52G, 52B and 52G are each formed of a semiconductor light emitting device, such as a light emitting diode. The light emitting device 52R is a device emitting red light, the light emitting device 52G is a device emitting green light, and the light emitting device 52B is a device emitting blue light. The green light emitting device 52G has such a nature that it is more easily resolved by human eyes than the light emitting devices emitting lights in other colors. Therefore, a more uniform impression can be provided by more densely arraying the green light emitting devices 52G. The image display unit may be constituted, instead of those light emitting devices, by using transmission display devices with color filters, such as colored liquid crystals, or other suitable reflecting display devices.

The image display unit capable of providing a required stereoscopic view by outputting respective light beams to the left and right eyes with the above-described pixel area 51 can be constituted by setting those pixel areas so as to produce two different images with distribution of the light beams per line or pixel.

FIGS. 9A to 9E show examples of the pattern for distributing left and right images to realize a stereoscopic view. In each of these drawings, "L" represents a pixel for emitting light in accordance with data for the left eye such that the light is output toward the left eye. On the other hand, "R" represents a pixel for emitting light in accordance with data for the right eye such that the light is output toward the right eye. Note that each drawing shows only an extracted portion of four horizontal pixels x four vertical pixels. FIG. 9A shows a pattern in which the left-eye pixels represented by "L" and the right-eye pixels represented by "R" are alternately arranged per horizontal line. FIG. 9B shows a pattern in which the left-eye pixels represented by "L" and the right-eye pixels represented by "R" are alternately arranged per vertical line. FIG. 9C shows a pattern in which the left-eye pixels and the right-eye pixels alternately appear checkerwise. In this pattern, the left-eye pixel and the right-eye pixel alternately appear per pixel in each horizontal line, and a similar pattern appears with a shift of one pixel in the horizontal direction between one current horizontal line and the next horizontal line. FIG. 9D shows the case in which a checkered pattern is formed as in FIG. 9C, but the checkered pattern is formed in unit size of two horizontal pixels x two vertical pixels. Further, FIG. 9E shows a pattern in which the left-eye pixels and the right-eye pixels alternately appear per two pixels in each horizontal line, and a similar pattern appears with a shift of one pixel in the horizontal direction between one current horizontal line and the next horizontal line. Note that the patterns of FIGS. 9A to 9E are shown merely by way of example and may be replaced with other suitable patterns. Also, while the overall display screen can be formed in the same pattern, it is possible, for example, to form different patterns in central and peripheral areas of the image display unit, or to arrange a pattern for distributing lights into left and right images primarily in an area that is assumed to correspond to the position of a face image. Further, instead of distributing the left-eye pixels and the right-eye pixels in a regular pattern, the left-eye pixels and the right-eye pixels may be distributed in an irregular pattern although wiring is complicated.

An example using small lenses, i.e., microlenses, arranged on the light emitting devices in one-to-one relation will be described below as one example of the structure of the image display unit.

Figure 10:
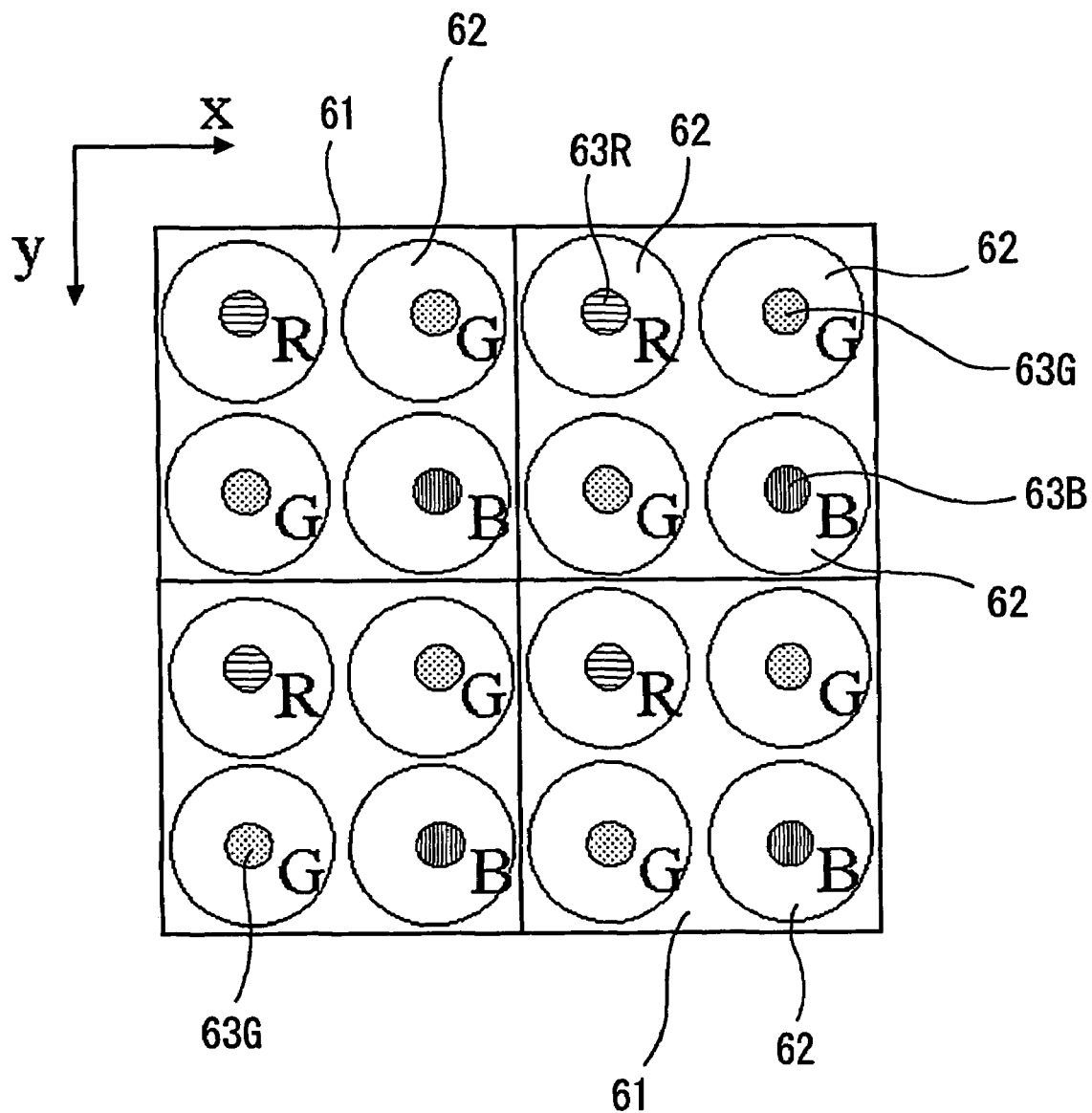
FIG. 10 is an illustration showing a construction of the image display unit at pixels and thereabout in one example of the information processing apparatus of the present invention.

FIG. 10 shows an arrangement in which four light emitting devices 63G, 63B and 63R each formed of a semiconductor light emitting device, such as a light emitting diode or a semiconductor laser, are disposed in each pixel 61. The light emitting device 63R is a device emitting red light, the light emitting device 63G is a device emitting green light, and the light emitting device 63B is a device emitting blue light. As mentioned above, the green light emitting device 63G has such a nature that it is more easily resolved by human eyes than the light emitting devices emitting lights in other colors. Therefore, a more uniform impression can be provided by more densely arraying the green light emitting devices 52G.

Small microlenses 62 each made of a spherical transparent body are arranged on the surface side of the image display unit, which corresponds to the light exit side of the light emitting devices 63G, 63B and 63R. The microlenses 62 serve as exit angle control portions for outputting lights from the light emitting devices 63G, 63B and 63R in the direction of a predetermined angle toward the left eye or the right eye, and they are formed of a transparent synthetic resin such as PMMA (polymethacrylic methyl), glass, or the like. The shape of each microlens is not limited to a sphere, but it may be conical, pyramidal, or rectangular. Also, the microlenses can be assembled into the image display unit by bonding a holding plate onto which the microlenses are integrally mounted in a matrix pattern, or by positioning the microlenses one by one. In order that each microlens 62 has the function of controlling the light exit angle, an opening for each light emitting device may be formed in a shield plate or the like to be directed toward one of the user's eyes, or the position of the microlens 62 may be shifted from an optical axis of the light from corresponding one of the light emitting devices 63G, 63B and 63R.

Figure 11:
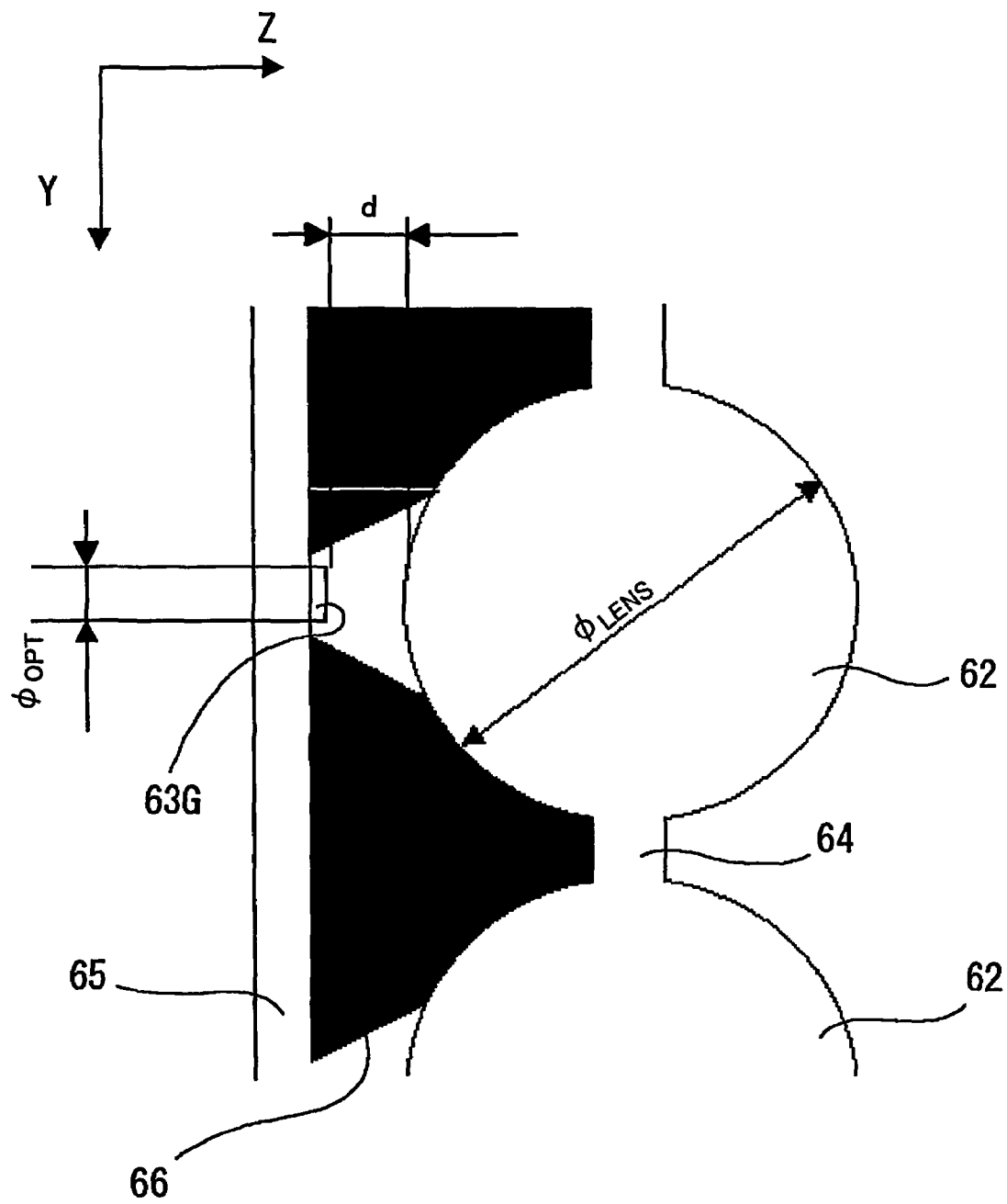
FIG. 11 is a sectional view of the image display unit in one example of the information processing apparatus of the present invention, the view showing the case in which there is no shift between an axis of a light emitting device and an axis of a microlens.
Figure 12:
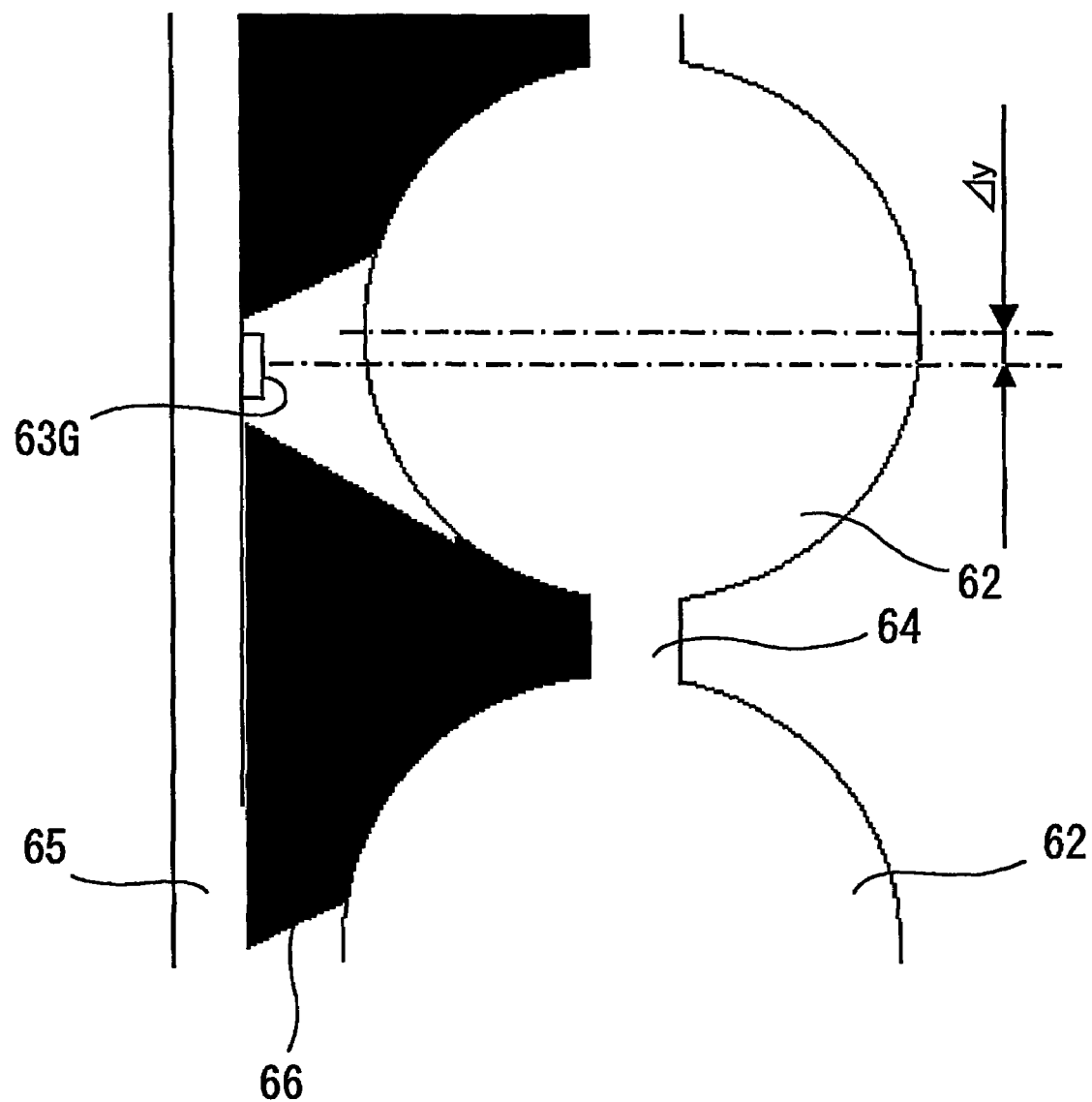
FIG. 12 is a sectional view of the image display unit in one example of the information processing apparatus of the present invention, the view showing the case in which there is a shift between the axis of the light emitting device and the axis of the microlens.

FIGS. 11 and 12 are each a schematic sectional view for explaining an example of controlling the light exit direction based on the position of the microlens 62. FIG. 11 shows an example in which an axis of the light emitting device 63G and an axis of the microlens 62 are aligned with each other, and FIG. 12 shows an example in which there is a shift between the axis of the light emitting device 63G and the axis of the microlens 62.

FIG. 11 typically shows the light emitting device 63G emitting green light, and the light emitting device 63G has a size $\phi_{OPT}$ of about 30 μm. In FIG. 11, the z-axis direction represents the direction normal to the display screen of the image display unit, and it is herein defined as the light exit direction. The light emitting device 63G is, e.g., a GaN-based light emitting diode, and the light emitting diode emitting blue light can also be constituted by, e.g., a GaN-based semiconductor. The light emitting device 63R emitting red light may be constituted by, e.g., a GaAs-based compound semiconductor. The light emitting devices 63G are each bonded onto a support substrate 65 and are arrayed in a matrix pattern at a pitch in the range of about 300 μm to 600 μm.

On the support substrate 65, a molded holding member 66 is disposed which serves not only as a member for holding the microlenses 62, but also as a shield plate for limiting the direction of light from the light emitting device to a proper angle. The molded holding member 66 has openings formed corresponding to respective positions of the light emitting device. Each of the openings has a diameter gradually increasing substantially in the form of a truncated cone, and the microlens 62 is fitted to an end of the opening opposed to the light emitting device. The molded holding member 66 and the microlenses 62 are fixedly bonded to each other, and so are the molded holding member 66 and the support substrate 65. The microlenses 62 are interconnected and held in place by holding portions 64 which hold the microlenses at their maximum diameter regions. A diameter $\phi_{LENS}$ of each microlens 62 is set herein to about 300 μm. With such an arrangement, a gap of a distance d is formed between the light emitting device 63G and the bottom of the microlens 62 mounted to the opening of the molded holding member 66, and light is introduced to the microlens 62 after passing through the gap.

FIG. 12 shows, as described above, an example in which there is a shift between the axis of the light emitting device 63G and the axis of the microlens 62. In FIG. 12, the light emitting device 63G is disposed in a position shifted by a distance Δy from a line passing the center of the microlens 62 and being parallel to the z-axis. When the light emitting device 63G is disposed in such a position shifted by the distance Δy, the light exiting from the light emitting device 63G is bent due to the shift from the axis of the microlens 62. Thus, the setting of that positional relationship enables lights to exit in respective directions toward the right eye and the left eye. The axis of the light emitting device 63G and the axis of the microlens 62 can be shifted from each other, for example, by a method of shifting the position of the light emitting device 63 on the support substrate 65, a method of shifting the position of the microlens 62 on it, or in the structure in which the microlenses 62 are mounted to respective openings in the molded holding member 66 one by one, by a method of shifting the position of each opening in the molded holding member 66 and hence shifting the position of each microlens 62. The example shown in FIG. 12 employs the method of shifting the position of the microlens 62. More specifically, the microlenses 62 are fixed to the molded holding member 66 such that the center of the opening in the molded holding member 66 is not aligned with the axis of the microlens 62. While FIG. 12 shows the shift in the y-direction, a similar shift may be produced, in addition to the y-direction, in any of the z-direction and the x-direction so that lights can be output in respective directions toward the right eye and the left eye.

Figure 13A:
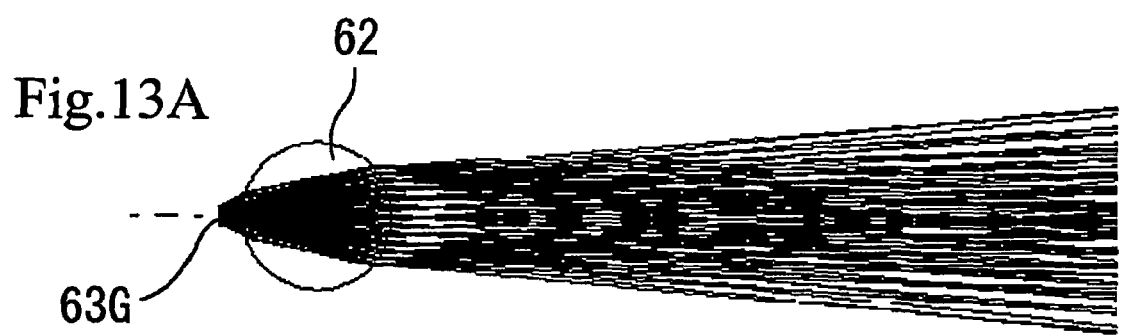
Figure 13B:
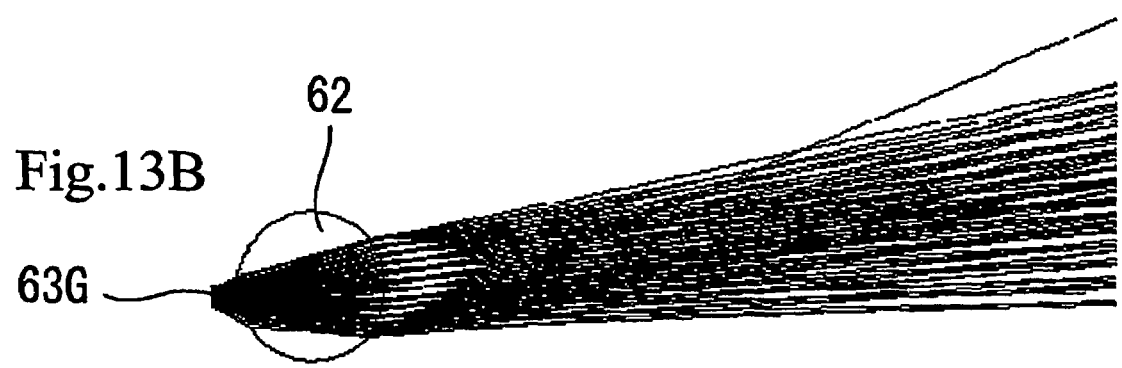

FIG. 13A shows a simulation result of spreading of a light beam when the axis of the light emitting device 63G and the axis of the microlens 62 are aligned with each other, and FIG. 13B shows a simulation result of spreading of a light beam when the axis of the light emitting device 63G and the axis of the microlens 62 are shifted from each other. In other words, FIG. 13A shows the relationship between the light emitting device and the microlens in the structure of FIG. 11, and FIG. 13B shows the relationship between the light emitting device and the microlens in the structure of FIG. 12. When the axis of the light emitting device 63G and the axis of the microlens 62 are aligned with each other, as shown in FIG. 13A, the light beam spreads about the z-axis, i.e., the direction normal to the display screen of the image display unit. However, when the axis of the light emitting device 63G and the axis of the microlens 62 are shifted from each other, as shown in FIG. 13B, an angle is given to the light exit direction and the light beam is radiated slightly obliquely upward as viewed in the drawing. This calculation example is on an assumption that the material of the microlens is PMMA, the diameter of the microlens is 300 μm, the diameter of the light emitting device is 30 μm, and the distance between the light emitting device and the microlens is 50 μm. FIG. 13A shows the case of Δy=0, and FIG. 13B shows the case of Δy=−15 μm. When PMMA is used as the material of the microlens, its refractive index varies depending on wavelength. The relationship between the refractive index and wavelength is shown in a table given below. The calculation is executed using data shown in the table.

| | Refractive Index of PMMA | | |
|---|---|---|---|
| Color | Blue | Green | Red |
| Light | F | e | C |
| Wavelength (nm) | 486.13 | 546.07 | 656.27 |
| Refractive Index | 1.49776 | 1.49776 | 1.48920 |

Figure 14A:
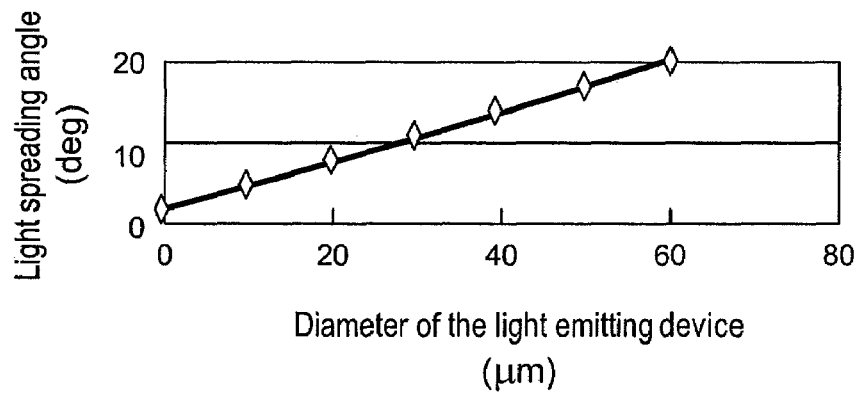
Figure 14B:
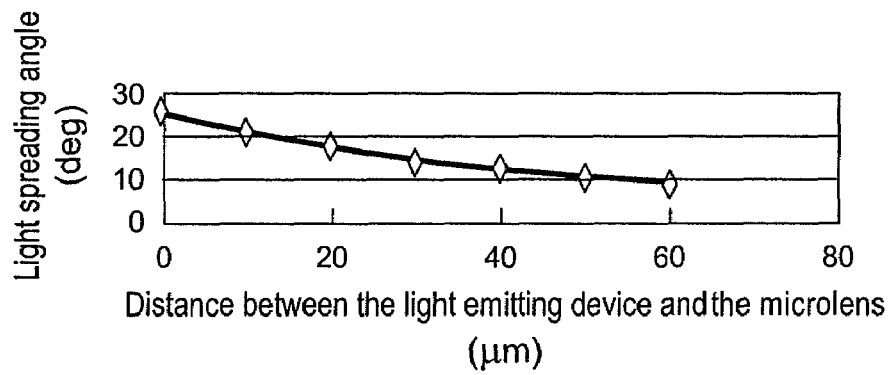
Figure 14C:
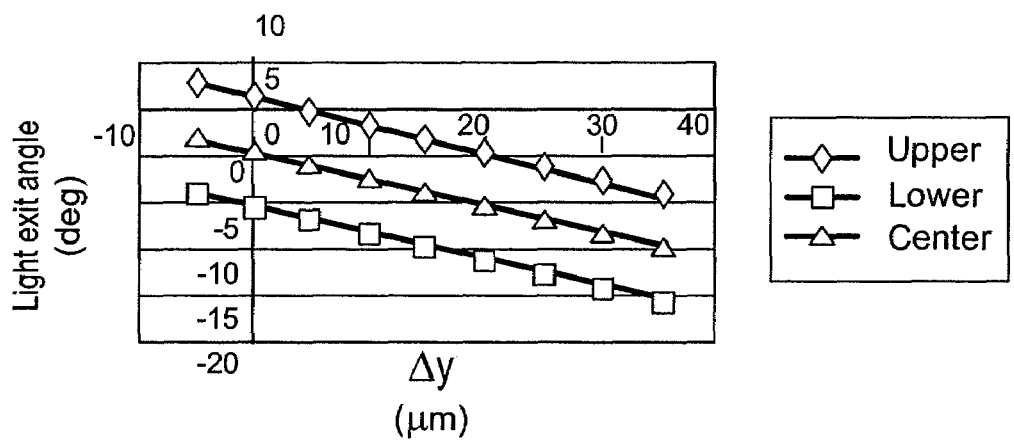

Furthermore, as plotted in FIGS. 14A to 14C, optical calculations are executed regarding the size and positional relation of the microlens and the light emitting device.

First, a graph of FIG. 14A shows an optical calculation result of the relationship between the diameter of the light emitting device and the light spreading angle. Conditions are similar to those in the case of FIG. 13A. Namely, the diameter of the light emitting device is changed on condition that the material of the microlens is PMMA, the diameter of the microlens is 300 μm, and the distance between the light emitting device and the microlens is 50 μm. As seen from the result of FIG. 14A, to obtain the light spreading angle of 10° as the above-mentioned target value under those conditions, the diameter of the light emitting device is preferably about 30 μm. Because the size of the microlens and the size of the light emitting device are relatively compared with each other, a size ration of the microlens to the light emitting device is preferably set, for example, to the range of 30:1 to 5:1.

A graph of FIG. 14B shows a result of calculating the effect of the distance between the light emitting device and the microlens upon the light spreading angle. Conditions are similar to those in the case of FIG. 14A. Namely, the distance d between the light emitting device and the microlens is variable on condition that the material of the microlens is PMMA, the diameter of the microlens is 300 µm, and the diameter of the light emitting device is 30 µm. As seen from the result of FIG. 14B, to obtain the light spreading angle of 10°, the distance between the light emitting device and the microlens is preferably set to about 50 µm.

A graph of FIG. 14C shows a calculation result of the relationship between the distance Δy (=Δx), i.e., a shift between the light emitting device and the microlens in the lateral direction, and the light exit angle. Upper and lower limit angles represent the range of θ for the light spreading area shown in FIG. 5. "Center" represents a value obtained by plotting the center of the upper and lower limit angles. As described above with reference to FIG. 5, the angle θ must be changed from 0.43° to −9.57° depending on the position on the display screen in order that different images are separately distributed to the left eye and the right eye. As seen from the graph of FIG. 14C, that condition can be satisfied by linearly changing the distance Δy from about 0 to 35 µm. Such a linear calculation process is approximately expressed by the following formula (4):

$$\theta = -\frac{1}{3.5}\nabla y \pm 5 \quad (4)$$

$\theta$: exit angle $\nabla y$: lateral relative position of light emitting device to lens From the optical calculations described above, it is confirmed that respective images dedicated for the left eye and the right eye can be display by using the microlens. While the above description is made, by way of example, of optical design in the left-and-right direction, similar design can be performed in the vertical direction as well. The device size has been discussed herein on assumption of a self-luminous device such as a light emitting diode. However, when just limiting the opening size causes a fear of a reduction in the light intensity such as occurred in the case of using a liquid crystal, an organic EL display, a plasma display, etc., the above-described method can also be applied after condensing light from a pixel by a lens or the like into a target size of emitted light. The use of the microlens can provide, in addition to high efficiency in utilization of light and low power consumption as mentioned above, other various advantages as follows. Because extraneous light obliquely entering the microlens is less likely to reflect in the direction toward the eyes, a high contrast and good quality of an image are obtained. Because an apparent size of each pixel is increased by the lens effect, an apparent interval between pixels is narrowed and pixels are avoided from appearing discrete visually. Hence, a continuous image can be obtained with a relatively small number of pixels.

One example of the microlenses will be described below with reference to FIGS. 15A and 15B.

Figure 15A:
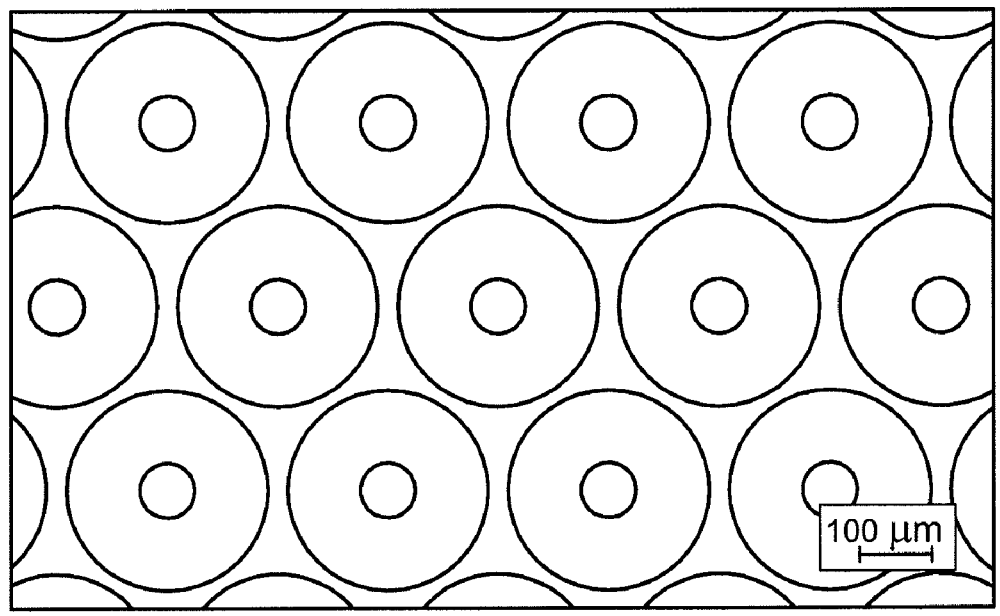
Figure 15B:
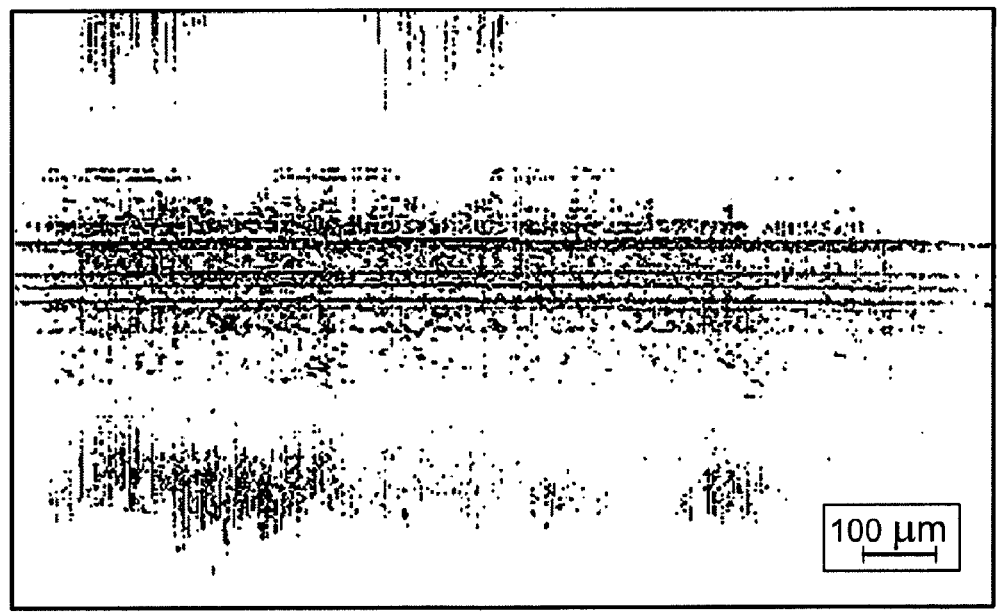

FIG. 15A is a front view of the microlenses, and FIG. 15B is a sectional view of the microlenses. The microlenses shown in FIGS. 15A and 15B has a structure in which individual microlenses each made of a nearly transparent spherical body are held at their maximum diameter portions on a holding member substantially in the form of a flat plate, and they are arrayed substantially at a maximum density. The diameter of each microlens is, e.g., about 300 µm. The image display unit can be formed by bonding, to an array of light emitting devices, the individual microlenses in a state held on the holding member substantially in the form of a flat plate. Because of no need of positioning the individual microlenses one by one, such an assembly process contributes to reducing the manufacturing cost of the portable communication terminal.

A method of keeping the eye position steady will be described below as one example of image processing that is employed in this embodiment.

Since, as described before with reference to FIG. 1, the cameras 13L, 13R for picking up a face image are disposed on both sides of the image display unit 11 and the user's face is displayed on the minor monitor 14 for confirmation, it is possible to make adjustment to some extent such that the face is positioned within the image pickup range of the cameras. In the hand-held terminal, however, the positional relationship between the position of the displayed image of the conversation partner and the cameras greatly vary in usual cases. So long as the face of the conversation partner is substantially included within the display screen, a shift of the line-of-sight direction is not extremely increased. To achieve more exact eye-to-eye matching and to prevent wobbling of the image, however, it is preferable to provide the function of stabilizing the eye position.

Figure 16:
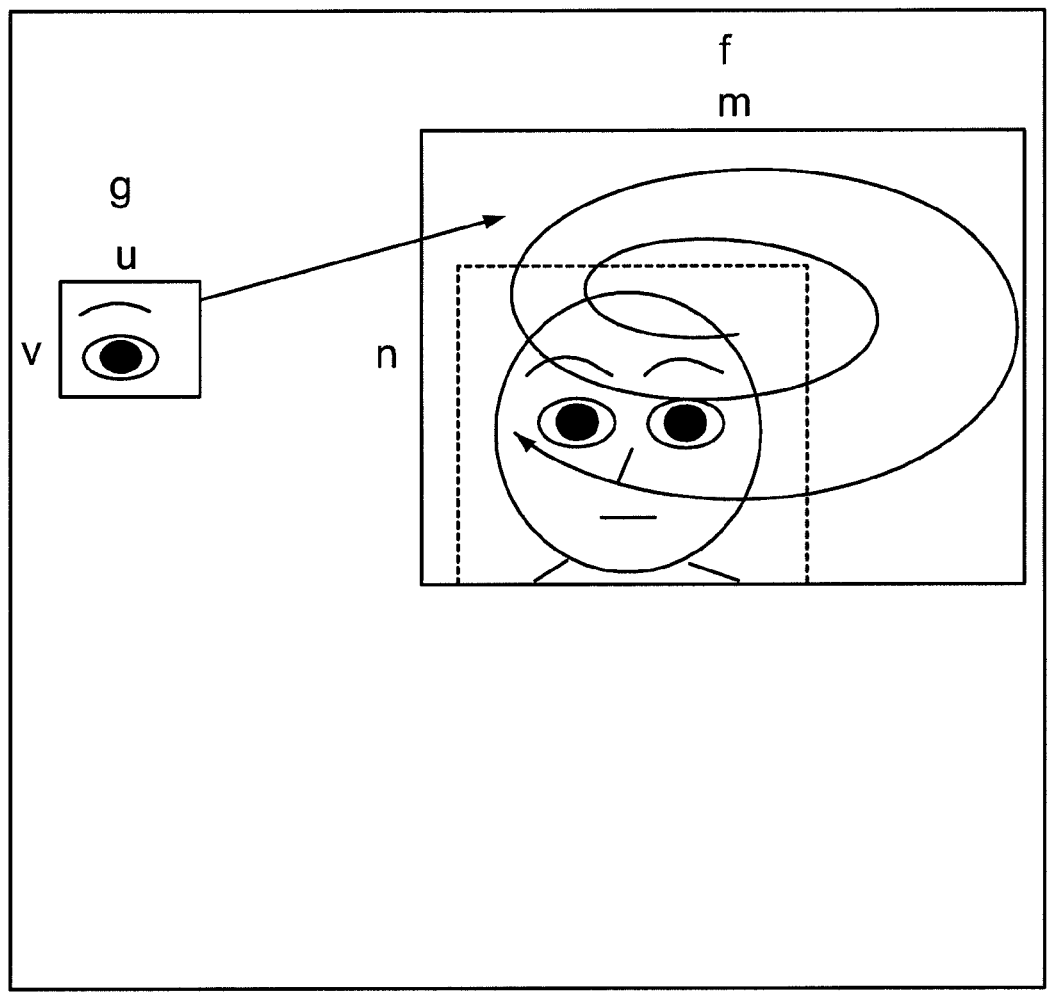
FIG. 16 is a conceptual view for explaining the concept of image processing as the function in one example of the information processing apparatus of the present invention, the view being referenced to explain image processing to find out an area of an image closest to a template.

A method of stabilizing the eye position is practiced by preparing a margin in an image area picked up by the cameras 13L, 13R and picking up an image in an area somewhat larger than a face. On the display side, the face image is displayed after adjustment with image processing such that the eyes of the conversation partner are positioned on a line connecting the cameras 13L, 13R and the center between the eyes is located closer to the center between those two cameras. Herein, a method of detecting the eye position from the face image can be practiced by using a suitable one of well-known image recognition methods. A method based on correlation detection will be described below as one example. FIG. 16 is a conceptual view for explaining a process of finding out a portion of an image which is closest to a template. This correlation detection is performed using a correlation-value calculation formula expressed by the following formula (5):

$$\text{correlation coefficient} \quad c_{ij} = \frac{\text{cov}_{ij}(f, g)}{\sqrt{\text{var}_{ij}(f)} \times \sqrt{\text{var}_{ij}(g)}} \quad (5)$$

$$\text{covariance} \quad \text{cov}_{ij}(f, g) = \sum_{m=i}^{i+u}\sum_{n=j}^{j+v}(f_{m,n} - f')(g_{m-u, n-v} - g')$$

$$\text{variance} \quad \text{var}_{ij}(f) = \sum_{m=i}^{i+u}\sum_{n=j}^{j+v}(f_{m,n} - f')^2$$

$$\text{variance} \quad \text{var}_{ij}(g) = \sum_{m=0}^{u}\sum_{n=0}^{v}(g_{m,n} - g')^2$$

A matching position is given by coordinate values (i, j) at which a correlation coefficient $c_{ij}$ in the formula (5) is maximized. Also, in the formula (5), g represents a template image. In this case, standard images of eyes, a nose, eyebrows, a mouth, etc. are registered in a memory beforehand. Further, f represents a target image to be displayed.

Figure 17:
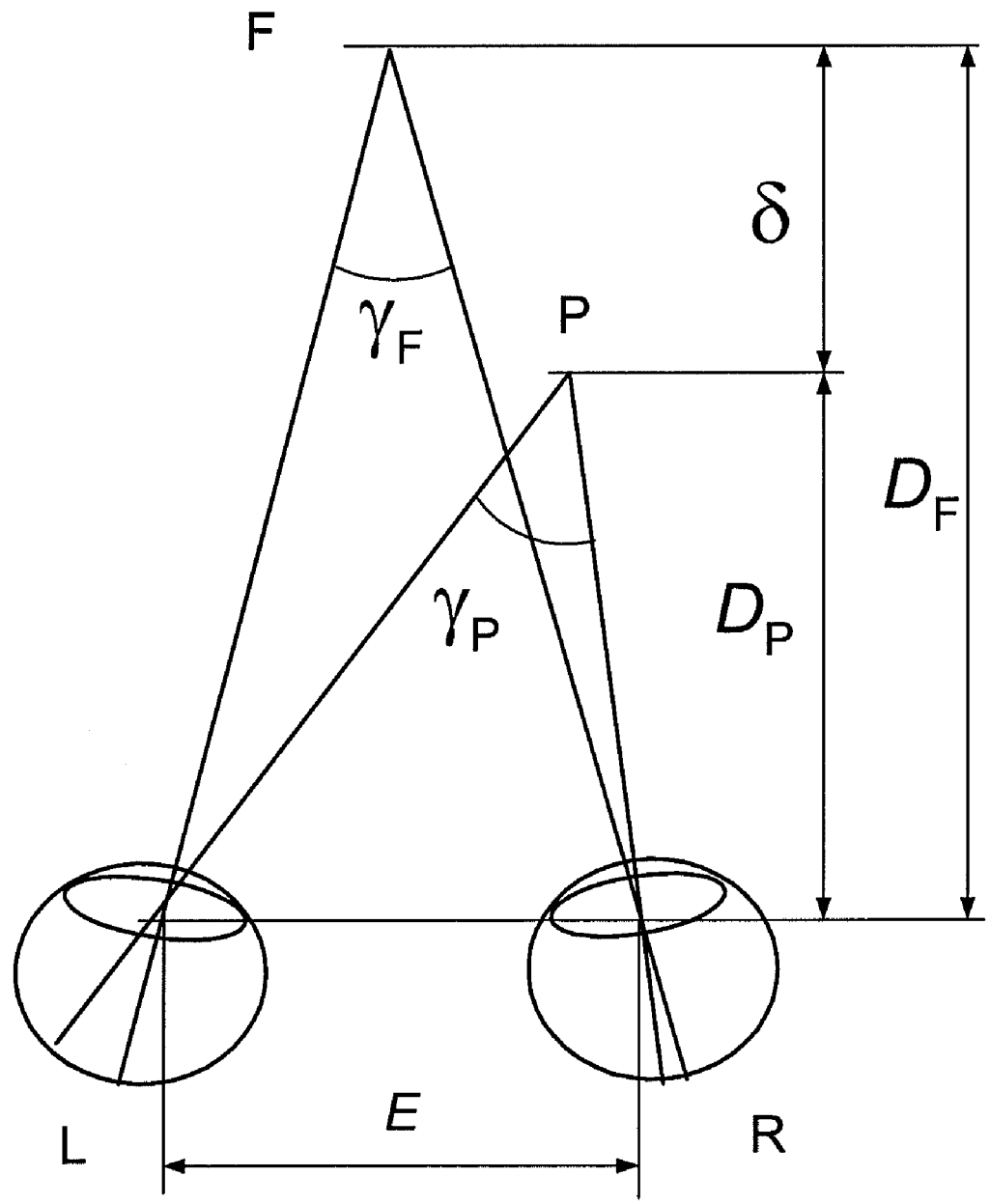
FIG. 17 is an illustration indicating parameters for a parallax.

A generally known method for autofocusing or auto-tracking is also applicable. The cameras 13L, 13R are disposed so as to direct and focus to a standard distance (e.g., $L_1$=250 mm). Accordingly, the distance to a face is determined from a difference between images picked up by the left and right cameras. This determination is based on a well-known geometrical calculation regarding a parallax. FIG. 17 shows parameters for a parallax. The calculation is executed using the following formula (6):

$$\text{absolute parallax} = \text{vergence angle: } \gamma_F, \gamma_P \quad (6)$$

parallax = relative parallax = difference between vergence angles:

$$d = \gamma_P - \gamma_F \approx E\delta/(D_F^2 - \delta D_F)$$
$$\approx E\delta/D_F^2$$

where $D_F, D_P \gg E$

Based on the distance calculated using the cameras 13L, 13R and the calculation formula, a standard apparent size of the face is assumed and a template size is adjusted to be matched with the apparent size. This size change can be performed by a simple matrix calculation. Such a matrix calculation is expressed, for example, by the following formula (7):

$$MTRX = \overbrace{\begin{bmatrix} 1/X_s & 0 & 0 & 0 \\ 0 & -1/X_s & 0 & 0 \\ 0 & 0 & 1 & 0 \\ 0 & 0 & 0 & 1 \end{bmatrix}}^{\text{normalization matrix}} \cdot \overbrace{\begin{bmatrix} a & 0 & 0 & 0 \\ 0 & b & 0 & 0 \\ 0 & 0 & 1 & 0 \\ 0 & 0 & 0 & 1 \end{bmatrix}}^{\text{scale-up/down matrix}} \cdot \quad (7)$$

$$\overbrace{\begin{bmatrix} 1 & 0 & 0 & 0 \\ 0 & 1 & 0 & 0 \\ 0 & 0 & 1 & 0 \\ X_o & Y_o & Z_o & 1 \end{bmatrix}}^{\text{movement matrix}} \cdot \overbrace{\begin{bmatrix} \cos[w] & \sin[w] & 0 & 0 \\ -\sin[w] & \cos[w] & 0 & 0 \\ 0 & 0 & 1 & 0 \\ 0 & 0 & 0 & 1 \end{bmatrix}}^{\text{z-axis rotation matrix}} \cdot$$

$$\overbrace{\begin{bmatrix} 1 & 0 & 0 & 0 \\ 0 & \cos[u] & \sin[u] & 0 \\ 0 & -\sin[u] & \cos[u] & 0 \\ 0 & 0 & 0 & 1 \end{bmatrix}}^{\text{x-axis rotation matrix}} \cdot \overbrace{\begin{bmatrix} \cos[v] & 0 & \sin[v] & 0 \\ 0 & 1 & 0 & 0 \\ -\sin[v] & 0 & \cos[v] & 0 \\ 0 & 0 & 0 & 1 \end{bmatrix}}^{\text{y-axis rotation matrix}} \cdot$$

$$\overbrace{\begin{bmatrix} 1 & 0 & 0 & 0 \\ 0 & 1 & 0 & 0 \\ 0 & 0 & -1 & 0 \\ 0 & 0 & t & 1 \end{bmatrix}}^{\text{viewpoint coordinate conversion matrix}} \cdot \overbrace{\begin{bmatrix} 1 & 0 & 0 & 0 \\ 0 & 1 & 0 & 0 \\ 0 & 0 & 1/s & 1/s \\ 0 & 0 & -1 & 0 \end{bmatrix}}^{\text{projection matrix}} \cdot \overbrace{\begin{bmatrix} X_s & 0 & 0 & 0 \\ 0 & -X_s & 0 & 0 \\ 0 & 0 & 1 & 0 \\ 0 & 0 & 0 & 1 \end{bmatrix}}^{\text{normalization inverse matrix}}$$

Instead of the calculations described above, the size change also be performed by registering a multistage of different sizes in a memory beforehand and employing the registered data as a lookup table.

After preparing a template for the face with a proper size by any of the above-described methods, an input image is searched by using the template, and the eye position in the face is determined by finding out a position where the correlation value is maximized. Then, the image is displaced with translation, rotation or scale-up/down so that the eye position is most exactly superimposed between the left and right images and the center between the eyes is positioned close to the center between the two cameras. At this time, the image can be properly displayed by using matrices for image conversion, such as expressed by the above formula (7).

Another example of the structure of the image display unit will be described below with reference to FIGS. 18A and 18B.

Figure 18A:
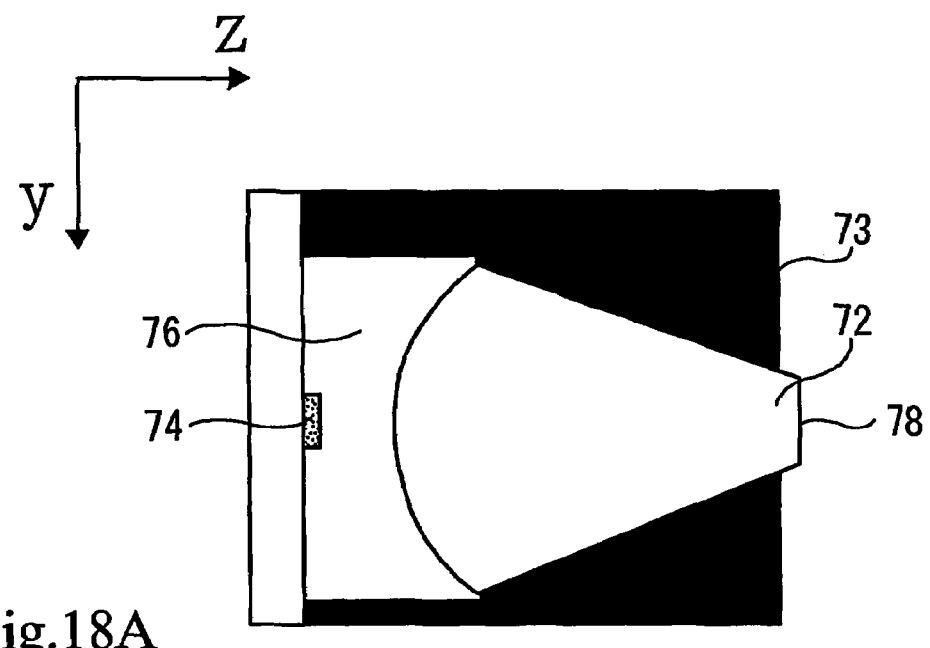
Figure 18B:
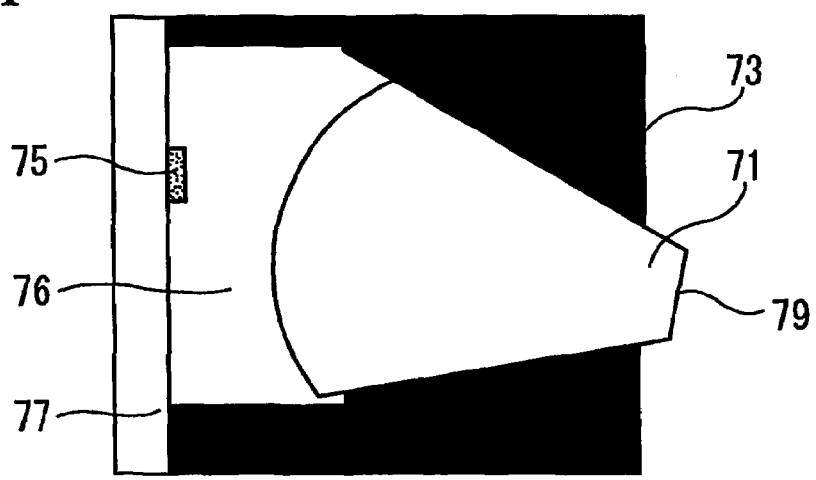

FIGS. 18A and 18B show an example of the image display unit employing a cone-shaped lens, in which FIG. 18A is a sectional view of the image display unit, and FIG. 18B is a perspective view of the lens. In the image display unit, light emitting devices 74, 75, such as light emitting diodes, are disposed on a support substrate 77. The light emitting device 74 is arranged substantially at the center of a vacant space 76 formed by a molded holding member 73 so that an emitted light beam is caused to exit nearly in the z-direction. The light emitting device 75 is also arranged in the vacant space 76 formed by the molded holding member 73, but it is disposed at a position shifted in the (−y)-direction substantially from the center of the vacant portion 76 so that an emitted light beam is caused to exit in a direction shifted toward the y-direction. The molded holding member 73 is a member obtained by molding a suitable synthetic resin. It serves not only as a member for holding the cone-shaped microlenses 71, 72, but also as a shield plate for limiting the direction of light from the light emitting device to a proper angle.

In the image display unit shown in FIGS. 18A and 18B, the microlenses 71, 72 each have a cone shape and are arranged such that their bottom-side ends each having a large diameter are positioned to face respectively the light emitting devices 74, 75 via the vacant space 76 and their tapered end surfaces 78, 79 are positioned on the display screen side. Particularly, in the microlenses 71, 72, the axial directions are aligned with the light exit directions. By tilting the microlenses 71, 72 to direct in respective directions in which light beams are to be output, therefore, the light exit angles can be adjusted to desired values and the respective light beams from the light emitting devices 74, 75 can be condensed and then output from the end surfaces 78, 79.

The use of the image display unit having such a structure enables the microlenses 71, 72, the molded holding member 73, etc. to be manufactured by the plastic molding technology. Accordingly, products employing the image display units can be manufactured at a reduced cost with mass production.

Usefulness resulting from outputting the emitted light beam at an angle narrowed to a value within 10° will be described below with reference to FIGS. 19 and 20.

Figure 19:
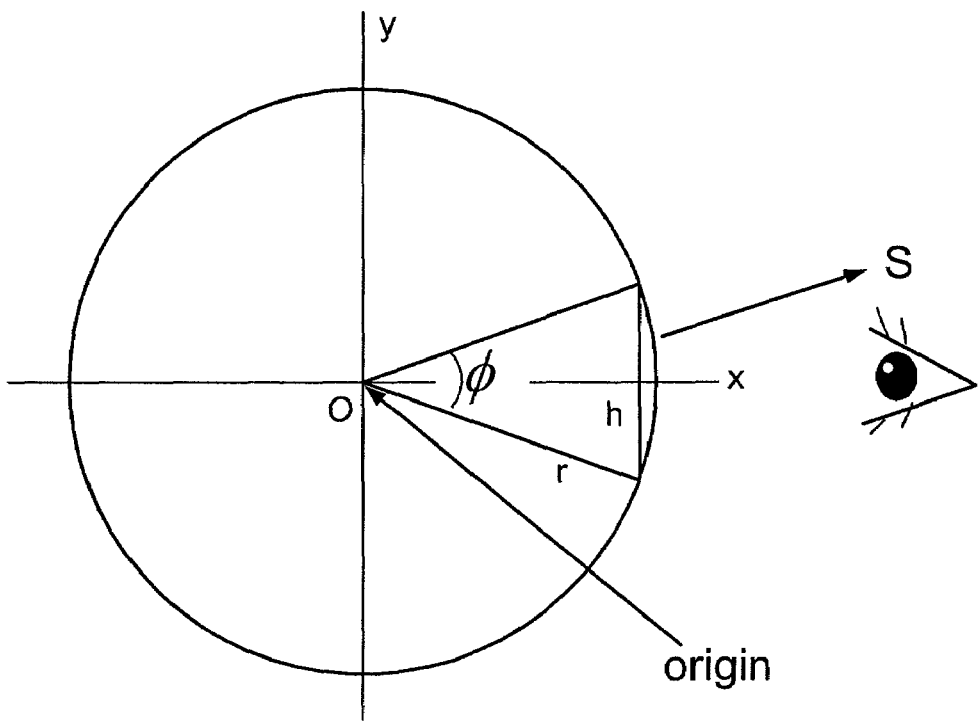
FIG. 19 is a chart showing parameters referenced to explain the relationship between emitted light and an exit angle when the microlens, etc. are employed.
Figure 20:
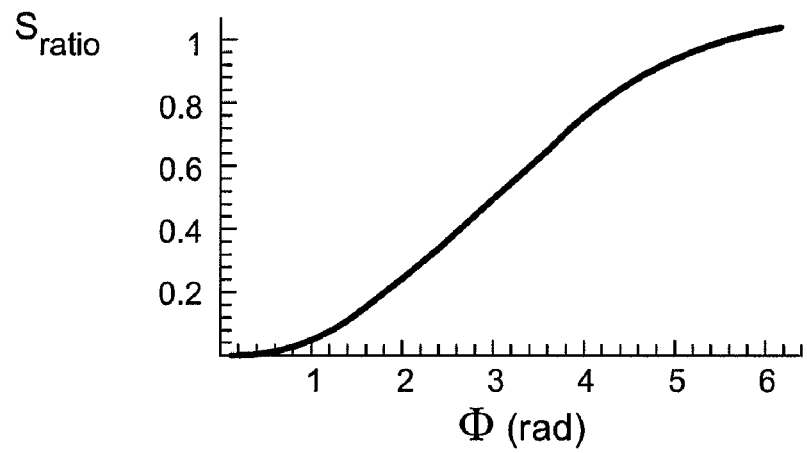
FIG. 20 is a graph for explaining the relationship between a ratio of a partial spherical area to a total spherical area and an exit angle $\phi$ when the microlens, etc. are employed.

FIG. 19 shows a spherical area S corresponding to an included angle φ at the origin along with related parameters. More specifically, r represents the radius of an imaginary sphere, and h represents a diameter of a region where a light beam spreading at the angle φ intersects the imaginary sphere. Also, S represents a spherical area cut by a cone with an apical angle φ, and $S_{ratio}$ represents a ratio of the spherical area S to a total spherical area. FIG. 20 is a graph showing the relationship between the angle φ and the spherical area ratio $S_{ratio}$ calculated from formulae shown on the left side of FIG. 19. In particular, when the angle φ is 10° (0.1745 rad), the spherical area ratio $S_{ratio}$ is a very small value of 0.00190265. In other words, comparing with the case of uniformly emitting a light beam over a hemisphere, the amount of light is reduced to 1/263 by emitting a light beam at an angle narrowed to within 10°. This suggests that, by controlling an angle of the emitted light beam, a good image can be obtained without increasing the amount of light. Also, this means that a contrast can be increased when the light emitting device is driven by the same electric power, and that a clear eye-to-eye matching face image can be displayed during conversation by employing the portable communication terminal of this embodiment.

Figure 21:
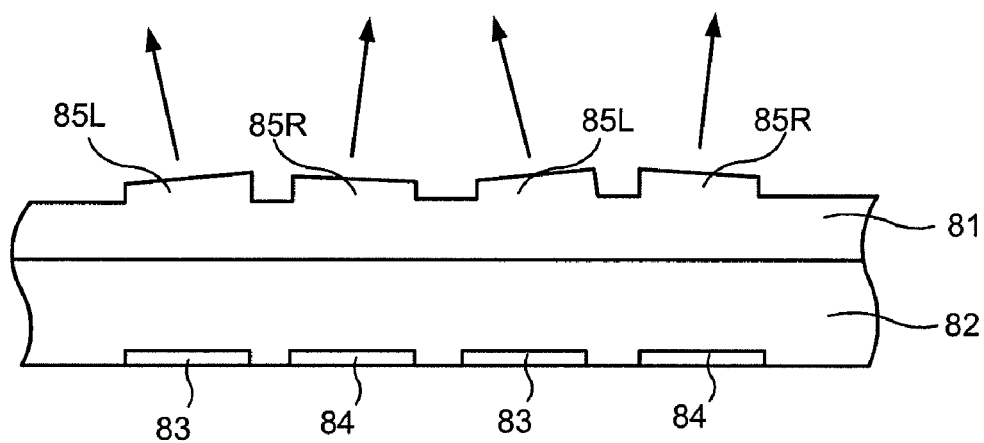
FIG. 21 is a sectional view showing the image display unit in still another example of the information processing apparatus of the present invention.

FIG. 21 is a sectional view showing still another example of the structure of the image display unit. In FIG. 21, light emitting devices 83, 84, such as light emitting diodes, are disposed on a substrate 82, and these light emitting devices 83, 84 are arrayed in a matrix pattern. A transparent substrate 81 including small diffraction plates 85L, 85R formed thereon is bonded to the surface side of the substrate 82. The small diffraction plates 85L, 85R have the functions of bending respective light beams emitted from the corresponding light emitting devices 83, 84 based on the diffraction phenomenon. The light beams bent based on the diffraction phenomenon are sent toward the user. More specifically, the small diffraction plate 85L controls a light exit angle so that the left eye of the user can see the diffracted light beam, and the small diffraction plate 85R controls a light exit angle so that the right eye of the user can see the diffracted light beam. As a result of such control, the function of looking the different images as a synthesized one works in the cerebrum of the user, and hence the user can see the images as if an eye-to-eye matching image is displayed on the screen, as shown in FIG. 2C, whereby communication can be realized in a natural eye-to-eye matching state.

In the foregoing, the method for constructing the image display unit to have the mixed pattern of a plurality of pixels for making display in accordance with the left-eye signal and a plurality of pixels for making display in accordance with the right-eye signal has been described in connection with the examples each using the spatially mixed pattern. However, the present invention is not limited to that method, the mixed pattern of a plurality of pixels for making display in accordance with the left-eye signal and a plurality of pixels for making display in accordance with the right-eye signal may be prepared by switching over the display in accordance with the left-eye signal and the display in accordance with the right-eye signal in a time-division manner.

Results of examining the relationship between the direction of line of sight and an impression of an eye-to-eye matching image will be briefly described below with reference to FIGS. 22A, 22B, 23A and 23B.

Figure 22A:
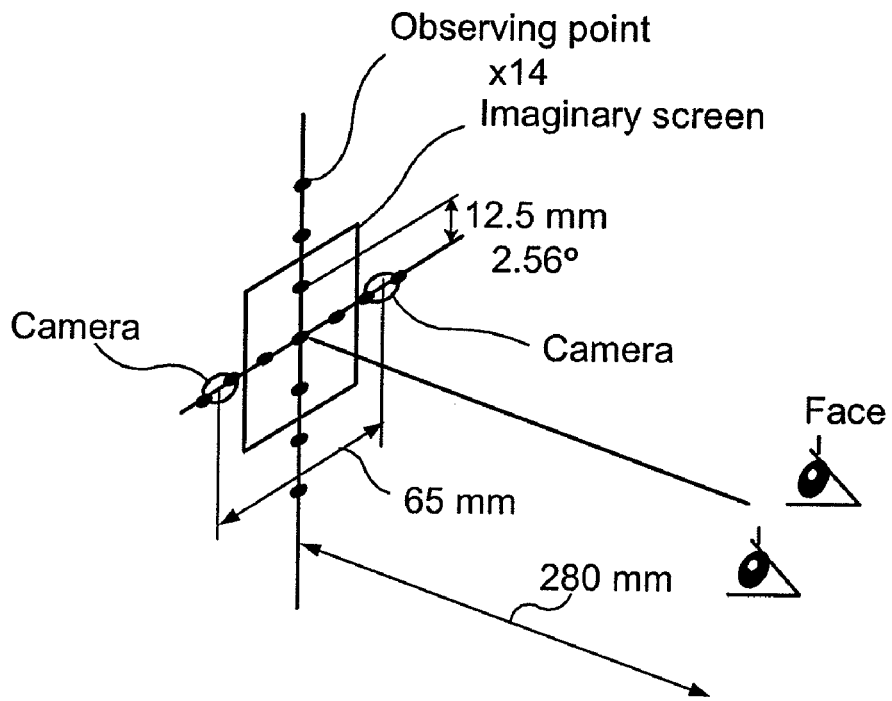
Figure 22B:
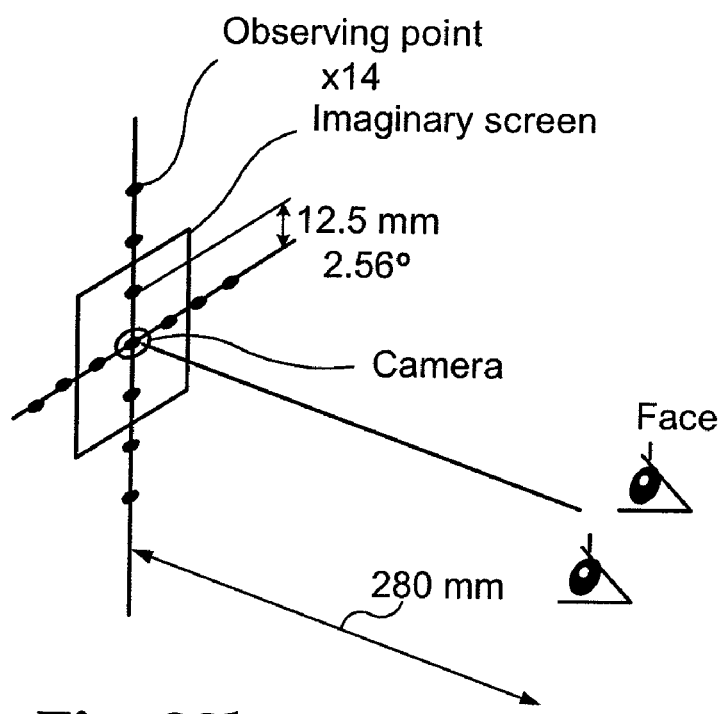
Figure 23A:
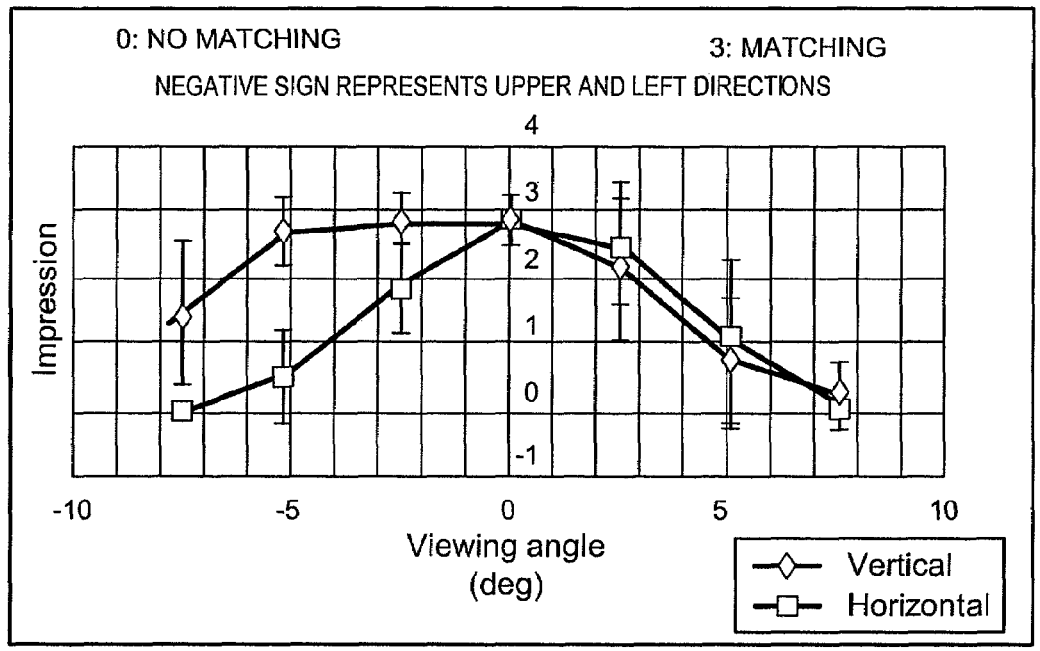
Figure 23B:
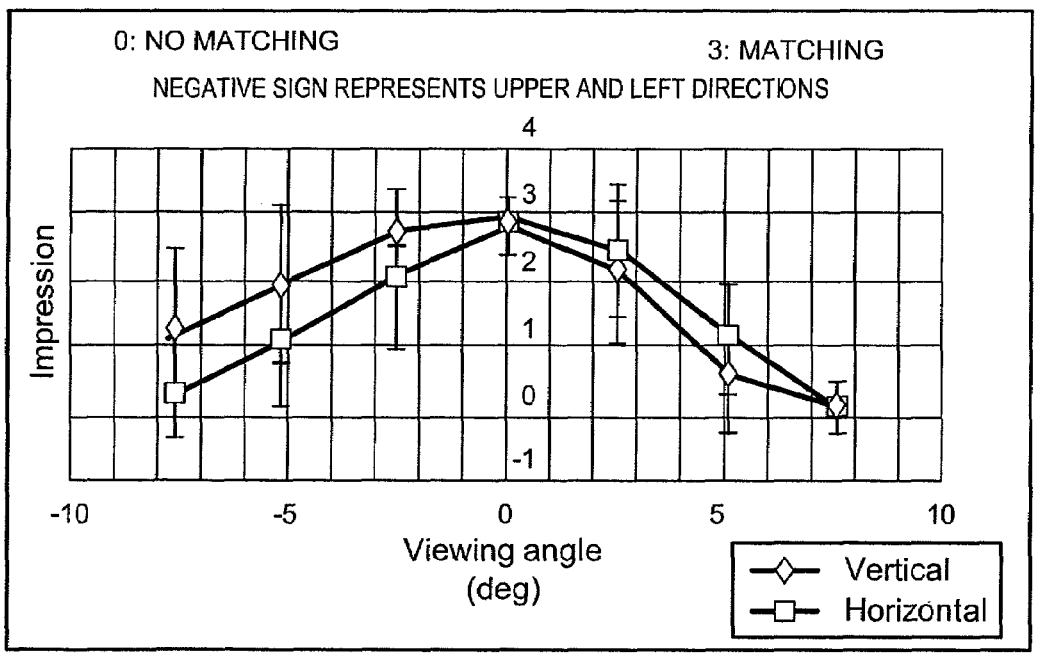

FIGS. 22A and 22B are illustrations showing schemes of experiments to examine the relationship between the direction of line of sight and an impression of eye-to-eye matching, in which FIG. 22A shows the case in which images are picked up by left and right cameras, and FIG. 22B shows the case in which one camera is assumed to be positioned at the center of an imaginary screen. The case of FIG. 22A includes a pair of cameras disposed on both side of the imaginary screen and corresponds to the structure of the portable communication terminal of this embodiment. The distance between the pair of camera is set the same value, i.e., 65 mm, as that between both the eyes. FIGS. 23A and 23B show results of setting observing points, i.e., 7 points in the vertical direction and 7 points in the horizontal direction, on each of the imaginary screens and examining impressions of images formed under those conditions. The interval between two observing points is 12.5 mm that corresponds to an angle of 2.56°. A test participant looks the observing points from a position 280 mm away from the imaginary screen.

As seen from those results, there is no significant difference between the case in which images are picked up by left and right cameras as shown in FIG. 23A and the case in which one camera is positioned at the center of the imaginary screen as shown in FIG. 23B. In other words, picking up images by the left and right cameras can provide the eye-to-eye matching effect comparable to that obtained by positioning one camera at the center of the imaginary screen. Further, the case in which images are picked up by the left and right cameras has a stronger tendency to give an eye-to-eye matching impression, even when the observing point is shifted in the vertical direction, than the case in which one camera is assumed to be positioned at the center of the imaginary screen. Thus, by employing the portable communication terminal of this embodiment, a satisfactory realism can be realized with the eye-to-eye matching during conversation.

With the portable communication terminal of this embodiment, as described above, by arranging a camera on each of the left and right sides of the image display unit, the user is able to make conversation with the conversation partner in an eye-to-eye matching state, and to continue the conversation with satisfactory realism. Also, since the efficiency in utilization of light is increased in the portable communication terminal, power consumption can be reduced and an image can be viewed at a high contrast even in an outdoor bright environment. Further, since the portable communication terminal has the structure that image pickup devices are disposed on both the left and right sides of the display screen, the overall size can be reduced and this feature is very useful for applications to portable equipment.

A further improved example of the foregoing portable communication terminal will be described below.

The portable communication terminal described as the invention is intended to arrange a camera on each of the left and right sides of the image display unit and to provide stereoscopic display for eye-to-eye matching with the conversation partner based on two images picked up by the cameras. However, the stereoscopic display for eye-to-eye matching with the conversation partner can be optimized and an image being easier to see can be produced by interpolating a parallax based on two images picked up by the cameras.

Figure 24:
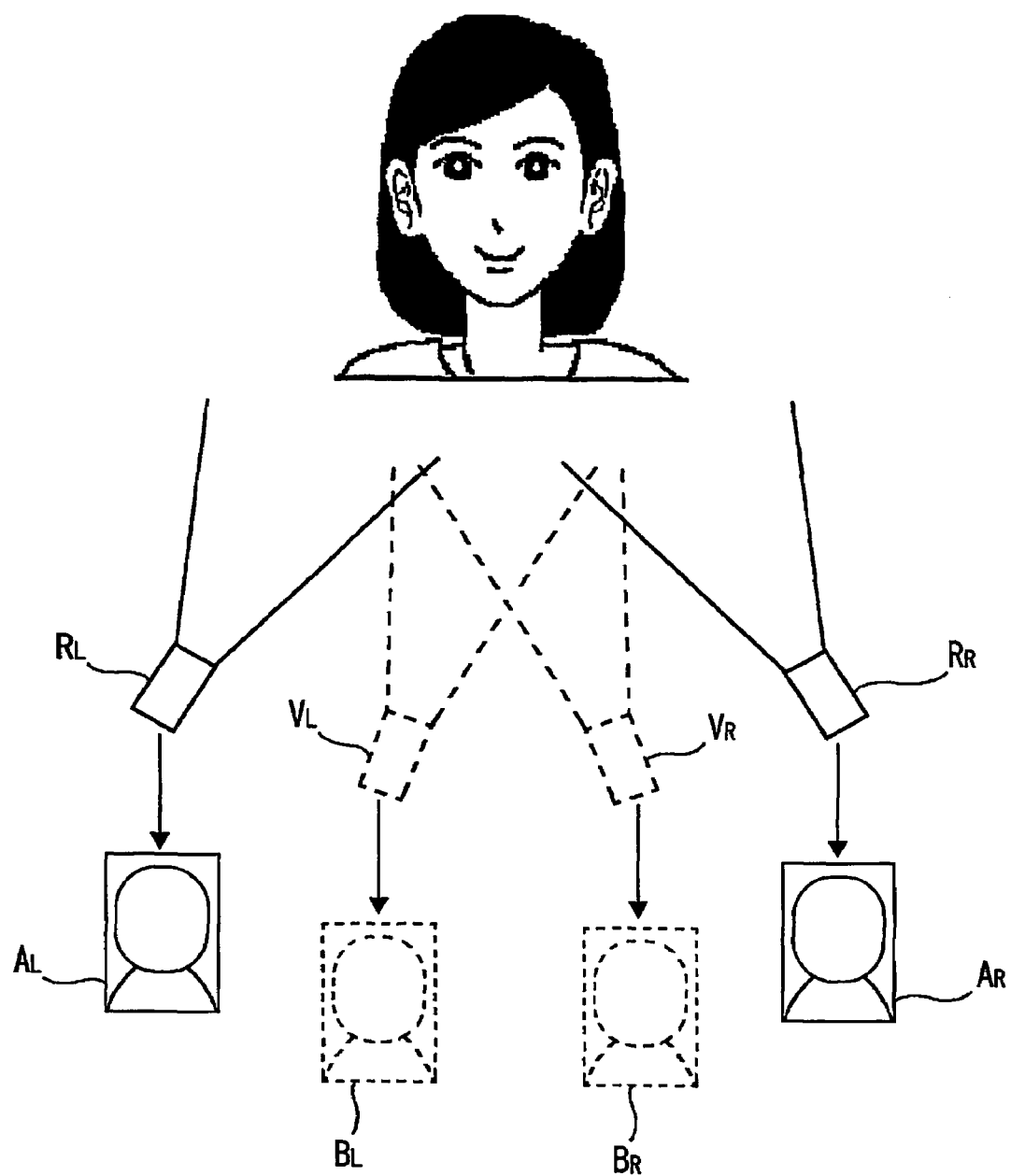
FIG. 24 is a conceptual view for explaining the concept of interpolating a parallax in the image processing apparatus of the present invention, the view being referenced to explain a process for producing, based on two images picked up by two cameras disposed on both left and right sides of the image display area, a new image that has a smaller parallax as if it is picked up by two virtual cameras disposed at a smaller spacing than that between the two actual cameras.

More specifically, when there is a relatively large shift between the images picked up by two cameras disposed on both the left and right sides of the image display unit, a parallax is too increased to synthesize such a double image, as it is, through fusion. Even if the double image can be synthesized through fusion, the resulting display is relatively hard to see and makes the user feel fatigue. In contrast, as shown in FIG. 24, the portable communication terminal described here is intended to, based on two images $A_R$, $A_L$ picked up by two cameras $R_R$, $R_L$ disposed on both the left and right sides of the image display unit, produce new images $B_R$, $B_L$ having a smaller parallax as if they are picked up by two imaginary cameras $V_R$, $V_L$ disposed at a narrower interval than that between the two cameras $R_R$, $R_L$. Thus, a more natural, much easier-to-see image can be realized by setting the parallax to a proper value.

Figure 25:
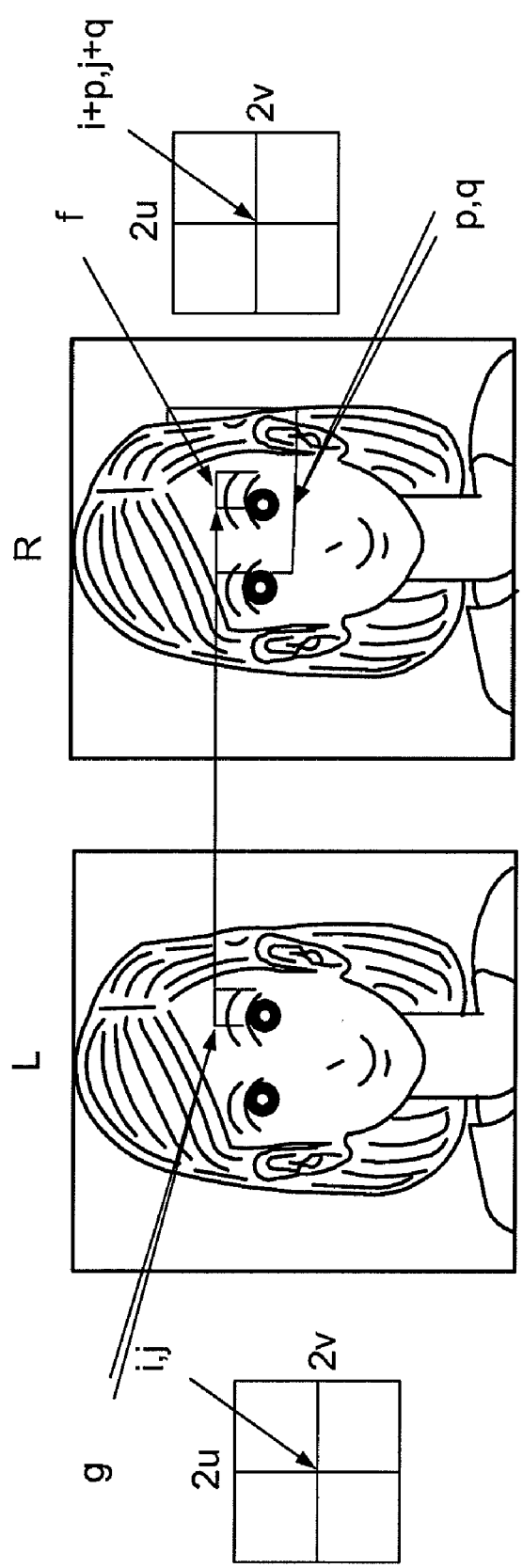
FIG. 25 is a conceptual view for explaining the concept of image processing as the function in one example of an information processing apparatus of the present invention, the view being referenced to explain image processing to obtain corresponding points in two images picked up by two cameras disposed on both left and right sides of the image display area.
Figure 28A:
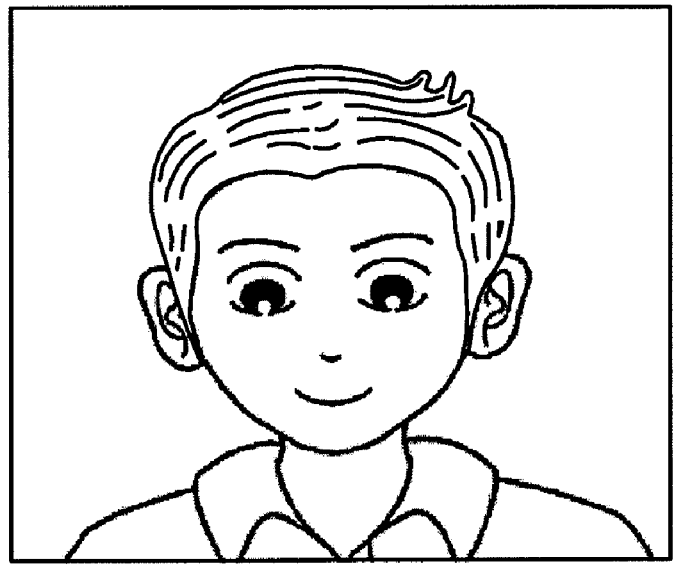
Figure 28B:
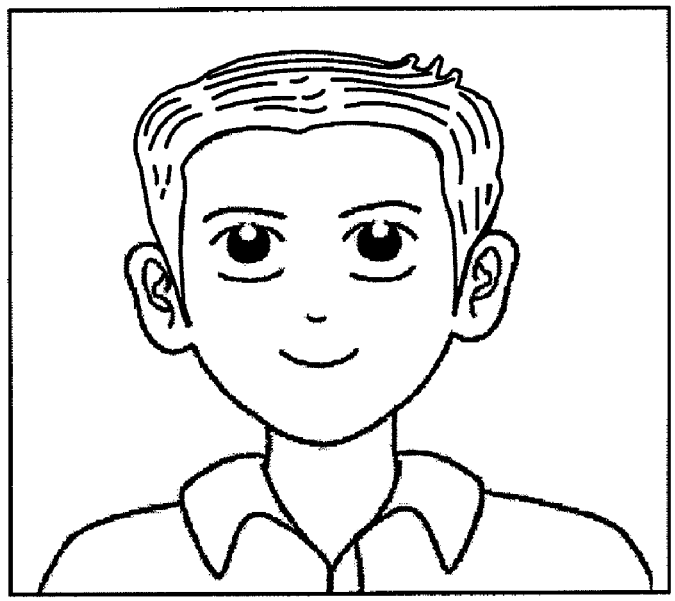

While the parallax is generally defined as a relative parallax by a difference between vergence angles as expressed by the formula (6), it is handled herein for the sake of simplicity as the number of pixels indicating a shift between corresponding points in two images picked up by the two cameras disposed on both the left and right sides of the image display unit. In the portable communication terminal, the image recognition method based on correlation detection can be utilized to determine corresponding points in two images. More specifically, in the portable communication terminal, as shown in FIG. 25, a group of pixels in a predetermined area including a face contour with respect to the background or a position of an eye or nose, for example, are extracted from an image L picked up by the camera disposed on the left side of the image display unit and are set as a template image g. Then, a target image f corresponding to the template image g is searched for from an image R picked up by the camera disposed on the right side of the image display unit, and the number of pixels indicating a shift between both the images is determined. In the portable communication terminal, by way of example, the control circuit 21 described above with reference to FIG. 3, which serves as image processing means, extracts a horizontal 2u×vertical 2v region having central coordinate values (i, j) from the image L and sets it to be the template image g. Then, the control circuit 21 searches a horizontal 2u×vertical 2v region having central coordinate values (i+p, j+q) with p, q being variable in the image R and finds out a region where a correlation coefficient $c_{ijpq}$ is maximized, thereby determining the target image f corresponding to the template image g. At this time, because a target to be picked up is primarily a face image in the portable communication terminal, a search range in the target image f corresponding to the template image g can be limited in advance depending on the position of the template image g in the image L, and therefore the image processing can be efficiently executed. The correlation detection is performed using a correlation-value calculation formula expressed by the following formula (8):

In the portable communication terminal, preferably, the processing to determine the number of pixels indicating the shift of the target image f corresponding to the template image g is executed for an entire range of the image, and two new images are produced by moving the two images R, L by a predetermined number of pixels based on the determined number of pixels indicating the shift. As a result, the portable communication terminal can produce two new images having a smaller parallax as if they are picked up by two imaginary cameras disposed at a narrower interval than that between the images R and L. Thus, by displaying those two newly produced images on the image display unit, the portable communication terminal enables the user to see the two images having a smaller parallax corresponding to a shorter distance between the two cameras, and to feel as if a good-quality stereoscopic image is displayed which is in an eye-to-eye matching state and is very easy to see.

$$\text{correlation coefficient} \quad c_{ij\ pq} = \frac{\text{cov}_{ij\ pq}(g, f)}{\sqrt{\text{var}_{ij}(g)} \times \sqrt{\text{var}_{i+p\ j+q}(f)}} \quad (8)$$

$$\text{covariance} \quad \text{cov}_{ij\ pq}(g, f) = \sum_{m=i-u}^{i+u} \sum_{n=j-v}^{j+v} (g_{m,n} - g')(f_{m+p,n+q} - f')$$

$$\text{variance} \quad \text{var}_{ij}(g) = \sum_{m=i-u}^{i+u} \sum_{n=j-v}^{j+v} (g_{m,n} - g')^2$$

$$\text{variance} \quad \text{var}_{i+p\ j+q}(f) = \sum_{m=i-u}^{i+u} \sum_{n=j-v}^{j+v} (f_{m+p,n+q} - f')^2$$

In the formula (8), g' represents an average value of the template image', and f' represents an average value of the target image f. Each of coordinate values (p, q) at which the correlation coefficient $c_{ijpq}$ expressed by the formula (8) is maximized represents the number of pixels indicating the shift of the target image f relative to the template image g, namely it corresponds to a parallax. In the portable communication terminal, therefore, an image having an arbitrary parallax can be produced from one of the images R, L by adjusting that shift. For example, when an image is produced by moving the image L by the number of pixels (p/2, q/2) corresponding to ½ of the shift representative of the parallax, the portable communication terminal can provide, as shown in FIG. 26, an image picked up from the center between the two cameras picking up the images R, L, i.e., an image as if it is looked from the front of an object.

Further, in the portable communication terminal, when a pixel to be drawn is not present in the original position from which the pixel has moved, a vacancy can be filled with a pixel obtained by interpolation from pixels positioned, for example, on the lateral side or the lateral and vertical sides of the relevant pixel, whereby a lack can be avoided. Moreover, in the portable communication terminal, when the parallax between the images R and L is so large as to cause the so-called occlusion, i.e., a concealed portion where some pixels appear in only one image, but do not appear in the other image, proper corresponding points are often not found. However, because the occlusion also occurs when a person looks the natural world, the person hardly has an unusual feeling if a degree of the occlusion is comparable to that in a natural situation.

Particularly, in the portable communication terminal, by setting the parallax determined from the two images R, L to a value reduced at any desired rate, a shift between images viewed from the left and right eyes of the user can be reduced and stereoscopic display can be performed in an easier-to-see state.

The parallax interpolation technique can also be used to increase the number of viewpoints. Usually, in the portable communication terminal, images looking from two viewpoints can be only produced from the two cameras. Based on those two images, however, images looking from four viewpoints can be obtained by producing other two images with interpolation such that the parallax is reduced to, e.g., ½ of the original one. Further, by similarly performing the interpolation so as to reduce the parallax to a predetermined value, the portable communication terminal can produce images looking from a larger number of viewpoints. Then, by properly performing stereoscopic display based on a plurality of thus-produced images with a reticular lens or the like, it is possible to reduce the so-called flipping phenomenon that the image is abruptly changed depending on a change of the viewpoint position, and to realize better stereoscopic display.

Furthermore, the method of searching the target image f corresponding to the template image g and determining corresponding points in the two images can also be practiced by any other suitable process than the correlation detection. For example, under conditions that brightness values of the two images picked up by the two cameras are hardly changed without being affected by respective diaphragms, etc. of the two cameras, the so-called Sum-of-Difference method can be used which utilizes a difference value between the brightness values of the two images. The so-called Sum-of-Squared- Difference (SSD) method is also usable. As a matter of course, however, under conditions that brightness values of the two images picked up by the two cameras differ from each other, a result with maximum accuracy can be obtained with the above-described method based on the correlation detection because those two images are normalized.

Additionally, the portable communication terminal executing an interpolation process for the parallax based on the two images picked up by the cameras disposed on both the left and right sides of the image display unit may be used on any of the transmitting side and the receiving side.

With the portable communication terminal of this embodiment, as described above, by interpolating the parallax based on the two images picked up by the cameras disposed on both the left and right sides of the image display unit, stereoscopic display for eye-to-eye matching with the conversation partner can be optimized and a more natural, easier-to-see image can be obtained. Accordingly, it is possible to avoid a situation that the parallax is too increased to synthesize a double image, as it is, through fusion, and a situation that the image synthesized through fusion is so hard to see, thus making the user feel fatigue. Hence, very excellent convenience in use can be provided.

The technique of interpolating the parallax based on the two images picked up by the cameras disposed on both the left and right sides of the image display unit is applicable to not only the portable communication terminal, but also to any other image processing apparatus displaying an image.

INDUSTRIAL APPLICABILITY

According to the present invention, as fully described above, the user of the portable communication terminal is able to make conversation in an eye-to-eye matching state with the conversation partner, and to continue the conversation with satisfactory realism. Also, since the efficiency in utilization of light is increased, power consumption can be reduced and an image can be viewed at a high contrast even in an outdoor bright environment. Further, because of the structure that image pickup devices are disposed on both the left and right sides of the display screen, the overall size can be reduced and this feature is very useful for applications to portable image processing apparatuses.

Moreover, according to the present invention, by producing new images with interpolation of a parallax based on two images picked up by image pickup means, stereoscopic display for eye-to-eye matching with the conversation partner can be optimized and a more natural, easier-to-see image can be obtained. Therefore, it is possible to avoid a situation that the parallax is too increased to synthesize a double image, as it is, through fusion, and a situation that the image synthesized through fusion is so hard to see, thus making the user feel fatigue. Hence, very excellent convenience in use can be provided.

The invention claimed is:

1. An image processing apparatus being portable and used for making conversation while presenting a picture, said image processing apparatus comprising:
   image display means for displaying a desired image in accordance with an image signal;
   image pickup means disposed respectively on the left and right sides of said image display means;
   an indicator that produces an indicating signal when a user is out of a predetermined area; and
   eye detecting means for detecting an eye position in image data picked up by the image pickup means,
   wherein said image display means has a substantially rectangular shape, and
   wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

2. An image processing apparatus according to claim 1, further comprising image processing means for producing new images with interpolation of a parallax based on two images picked up by said image pickup means,
   wherein the two new images produced by said image processing means are displayed on a display screen of said image display means.

3. An image processing apparatus according to claim 2, wherein:
   said image processing means sets the parallax determined from the two images picked up by said image pickup means to a value reduced at any desired rate.

4. An image processing apparatus according to claim 2, wherein:
   said image processing means determines corresponding points in the two images picked up by said image pickup means and moves the two images picked up by said image pickup means by a predetermined number of pixels based on the number of pixels indicating a shift between the determined corresponding points, thereby producing the two new images.

5. An image processing apparatus according to claim 4, wherein:
   said image processing means determines the corresponding points by detecting correlation between the two images picked up by said image pickup means.

6. An image processing apparatus according to claim 1, wherein:
   said image pickup means are constituted by solid-state image pickup devices.

7. An image processing apparatus being portable and used for making conversation while presenting a picture, said image processing apparatus comprising:
   a portable housing;
   image display means mounted in a surface of said housing and displaying a desired image in accordance with an image signal;
   image pickup means disposed on the surface of said housing respectively on the left and right sides of said image display means;
   an indicator that produces an indicating signal when a user is out of a predetermined area; and
   eye detecting means for detecting an eve position in image data picked up by the image pickup means,
   wherein said image display means has a substantially rectangular shape, and
   wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

8. An image processing apparatus according to claim 7, further comprising image processing means for producing new images with interpolation of a parallax based on two images picked up by said image pickup means, wherein the two new images produced by said image processing means are displayed on a display screen of said image display means.

9. An image processing apparatus according to claim 8, wherein:
said image processing means sets the parallax determined from the two images picked up by said image pickup means to a value reduced at any desired rate.

10. An image processing apparatus according to claim 8, wherein:
said image processing means determines corresponding points in the two images picked up by said image pickup means and moves the two images picked up by said image pickup means by a predetermined number of pixels based on the number of pixels indicating a shift between the determined corresponding points, thereby producing the two new images.

11. An image processing apparatus according to claim 10, wherein:
said image processing means determines the corresponding points by detecting correlation between the two images picked up by said image pickup means.

12. An image processing apparatus according to claim 7, wherein:
said housing has a size allowing a user to hold said housing by one hand,
a display screen of said image display means has a horizontal width in the range of about 10 mm to about 100 mm, and
a distance between said image pickup means on the left and right sides is set to be larger than the horizontal width of said display screen.

13. An image processing apparatus being portable and used for making conversation while presenting a picture, said image processing apparatus comprising:
image display means including a mixed pattern of a plurality of pixels for making display in accordance with a left-eye signal and a plurality of pixels for making display in accordance with a right-eye signal;
image pickup means disposed respectively on the left and right sides of said image display means;
an indicator that produces an indicating signal when a user is out of a predetermined area; and
eye detecting means for detecting an eye position in image data picked up by the image pickup means,
wherein said image display means has a substantially rectangular shape, and
wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

14. An image processing apparatus according to claim 13, further comprising image processing means for producing new images with interpolation of a parallax based on two images picked up by said image pickup means,
wherein the two new images produced by said image processing means are displayed on a display screen of said image display means.

15. An image processing apparatus according to claim 14, wherein:
said image processing means sets the parallax determined from the two images picked up by said image pickup means to a value reduced at any desired rate.

16. An image processing apparatus according to claim 14, wherein:
said image processing means determines corresponding points in the two images picked up by said image pickup means and moves the two images picked up by said image pickup means by a predetermined number of pixels based on the number of pixels indicating a shift between the determined corresponding points, thereby producing the two new images.

17. An image processing apparatus according to claim 16, wherein:
said image processing means determines the corresponding points by detecting correlation between the two images picked up by said image pickup means.

18. An image processing apparatus according to claim 13, wherein:
said image display means includes output means for outputting lights to both eyes of a user independently of each other.

19. An image processing apparatus according to claim 18, wherein said output means comprises:
light emitting means for emitting desired light in accordance with the left-eye signal or the right-eye signal; and
exit angle control means for controlling the light from said light emitting means to exit in the direction of a predetermined angle.

20. An image processing apparatus according to claim 19, wherein:
said light emitting means comprises a plurality of light emitting devices in an array, and
said exit angle control means comprises openings each formed per said light emitting device and directed toward one of both the eyes of the user.

21. An image processing apparatus according to claim 19, wherein:
said exit angle control means is a microlens array comprising a plurality of small lenses arrayed in a matrix pattern, and
said light emitting devices are arranged to be relatively shifted from positions of the corresponding small lenses in the in-plane direction of said microlens array such that the lights are output to both the eyes of the user independently of each other.

22. An image processing apparatus according to claim 21, wherein:
a size ratio of said small lens to said light emitting device is in the range of 30:1 to 5:1.

23. An image processing apparatus according to claim 21, wherein:
said small lens has a spherical, conical, pyramidal, or rectangular shape.

24. An image processing apparatus according to claim 19, wherein:
said light emitting means comprises a plurality of light emitting devices in an array, and
said exit angle control means comprises small diffraction plates arrayed in a matrix pattern and each outputting diffracted light directed toward one of both the eyes of the user.

25. An image processing apparatus according to claim 19, wherein:
said exit angle control means provides linear interpolation of an exit angle of each light emitting means between one end of said image display means on the same side as one eye in the horizontal direction and the other end on the opposite side.

26. An image processing apparatus according to claim 16, wherein:
the mixed pattern of a plurality of pixels for making display in accordance with a left-eye signal and a plurality of pixels for making display in accordance with a right-eye signal is obtained in said image display means by switching over the display in accordance with the left-eye signal and the display in accordance with the right-eye signal in a time-division manner.

27. An information processing system comprising:
a plurality of portable information processing terminals used for making conversation while presenting a picture,
each of said information processing terminals comprising:
image display means capable of displaying an image including a face of a conversation partner;
image pickup means disposed respectively on the left and right sides of said image display means;
an indicator that produces an indicating signal when a user is out of a predetermined area; and
eye detecting means for detecting an eve position in image data picked up by the image pickup means,
wherein said information processing terminals is able to perform communication there between,
wherein said image display means has a substantially rectangular shape, and
wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

28. An information processing system according to claim 27, wherein:
the face of the conversation partner is displayed on a display screen of said image display means in eye-to-eye matching with a user.

29. An information processing system according to claim 27, wherein:
said information processing terminal includes image processing means for holding an eye position on the display screen substantially fixed on the display screen.

30. An information processing system according to claim 28, wherein:
each of said information processing terminals further comprises image processing means for producing new images with interpolation of a parallax based on two images picked up by said image pickup means, and
the two new images produced by said image processing means are displayed on the display screen of said image display means in said information processing terminal belonging to the conversation partner.

31. An image processing apparatus used for making conversation while presenting a picture, said image processing apparatus comprising:
image display means for displaying a desired image in accordance with an image signal;
image pickup means disposed respectively on the left and right sides of said image display means;
image processing means for producing new images with interpolation of a parallax based on two images picked up by said image pickup means;
an indicator that produces an indicating signal when a user is out of a predetermined area; and
eye detecting means for detecting an eye position in image data picked up by the image pickup means,
wherein the two new images produced by said image processing means are displayed on a display screen of said image display means,
wherein said image display means has a substantially rectangular shape, and
wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

32. An image processing apparatus used for making conversation while presenting a picture, said image processing apparatus comprising:
a housing;
image display means mounted in a surface of said housing and displaying a desired image in accordance with an image signal;
image pickup means disposed on the surface of said housing respectively on the left and right sides of said image display means;
image processing means for producing new images with interpolation of a parallax based on two images picked up by said image pickup means;
an indicator that produces an indicating signal when a user is out of a predetermined area; and
eye detecting means for detecting an eve position in image data picked up by the image pickup means,
wherein the two new images produced by said image processing means are displayed on a display screen of said image display means,
wherein said image display means has a substantially rectangular shape, and
wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

33. An image processing apparatus used for making conversation while presenting a picture, said image processing apparatus comprising:
image display means including a mixed pattern of a plurality of pixels for making display in accordance with a left-eye signal and a plurality of pixels for making display in accordance with a right-eye signal;
image pickup means disposed respectively on the left and right sides of said image display means;
image processing means for producing new images with interpolation of a parallax based on two images picked up by said image pickup means;
an indicator that produces an indicating signal when a user is out of a predetermined area; and
eye detecting means for detecting an eye position in image data picked up by the image pickup means,
wherein the two new images produced by said image processing means are displayed on a display screen of said image display means,
wherein said image display means has a substantially rectangular shape, and
wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

34. An information processing system comprising:

a plurality of portable information processing terminals used for making conversation while presenting a picture, each of said information processing terminals comprising:

image display means capable of displaying an image including a face of a conversation partner;

image pickup means disposed respectively on the left and right sides of said image display means;

an indicator that produces an indicating signal when a user is out of a predetermined area; and eye detecting means for detecting an eye position in image data picked up by the image pickup means, wherein each of said information processing terminals further comprises image processing means for producing new images with interpolation of a parallax based on two images picked up by said image pickup means, and the two new images produced by said image processing means are displayed on the display screen of said image display means in said information processing terminal belonging to the conversation partner when communication is performed between said information processing terminals, wherein said image display means has a substantially rectangular shape, and wherein said image pickup means are disposed in predetermined zones for presenting an eye-matching picture, the predetermined zones being horizontally aside from left and right side ends of said image display means and being from approximately 25 mm in the upward to approximately 12.5 mm in the downward around the center of said image display means.

* * * * *